(12) United States Patent
Wada et al.

(10) Patent No.: US 10,648,837 B2
(45) Date of Patent: May 12, 2020

(54) ENCODER, PRINTER, AND ROBOT

(71) Applicant: Seiko Epson Corporation, Tokyo (JP)

(72) Inventors: Hiroshi Wada, Azumino (JP);
Kunihiko Yano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/145,775

(22) Filed: Sep. 28, 2018

(65) Prior Publication Data

US 2019/0101418 A1    Apr. 4, 2019

(30) Foreign Application Priority Data

Sep. 29, 2017    (JP) ................................ 2017-189830

(51) Int. Cl.

| | |
|---|---|
| *G01D 5/34* | (2006.01) |
| *B41J 2/47* | (2006.01) |
| *G02B 27/12* | (2006.01) |
| *B25J 13/08* | (2006.01) |
| *G01D 5/347* | (2006.01) |
| *B25J 9/16* | (2006.01) |

(52) U.S. Cl.
CPC ................ *G01D 5/345* (2013.01); *B25J 9/16* (2013.01); *B25J 13/088* (2013.01); *B41J 2/47* (2013.01); *G01D 5/34715* (2013.01); *G02B 27/126* (2013.01)

(58) Field of Classification Search
CPC .......... G01D 5/345; G01D 5/344; G01D 5/34; G01D 5/34707; G01D 5/347; G01D 5/3473; G01D 5/34776; G01D 5/34784; G02B 27/126; G02B 27/12; G02B 27/10; B25J 9/1697; B25J 9/1694; B41J 2/2103; B41J 3/4075; B41J 2/47; Y10S 901/31; Y10S 901/47

See application file for complete search history.

(56) References Cited

U.S. PATENT DOCUMENTS

| | | | | |
|---|---|---|---|---|
| 3,584,959 | A | * | 6/1971 | Del Carlo .............. G01D 5/345 356/368 |
| 4,967,072 | A | * | 10/1990 | Nishimura ............... G01D 5/38 250/231.16 |

(Continued)

FOREIGN PATENT DOCUMENTS

| | | |
|---|---|---|
| JP | 06-194189 A | 7/1994 |
| JP | 2008-241453 A | 10/2008 |

*Primary Examiner* — John R Lee
(74) *Attorney, Agent, or Firm* — Harness, Dickey & Pierce, P.L.C.

(57) ABSTRACT

An encoder includes a light emitting portion emitting light, an optical element portion splitting the light into a first beam and a second beam, an optical scale receiving the first beam and the second beam from the optical element portion, and a light receiving portion receiving the first beam and the second beam from the optical scale and outputting a signal in accordance with intensity of the received light, in which the optical element portion includes a prism on which the light is incident, a beam splitter disposed on the prism and splitting the light incident on the prism into the first beam heading for the optical scale and the second beam heading for an inside of the prism, and a first mirror portion disposed on the prism and reflecting the second beam from the beam splitter toward the optical scale.

20 Claims, 24 Drawing Sheets

(56) References Cited

U.S. PATENT DOCUMENTS

| | | | | |
|---|---|---|---|---|
| 5,424,535 A * | 6/1995 | Albion | G01D 5/345 | 250/225 |
| 5,602,388 A * | 2/1997 | Maenza | G01D 5/34715 | 250/201.5 |
| 6,038,523 A * | 3/2000 | Akahane | G01D 5/2492 | 368/250 |
| 7,054,095 B2 * | 5/2006 | Ishizuka | G11B 5/596 | 360/75 |
| 7,476,844 B2 * | 1/2009 | Igarashi | G01D 5/24404 | 250/231.13 |
| 8,297,727 B2 * | 10/2012 | Katayama | B41J 11/008 | 347/16 |
| 10,139,251 B2 * | 11/2018 | Tokushima | G01D 5/345 | |
| 10,184,808 B2 * | 1/2019 | Tomioka | G01D 5/345 | |
| 2002/0145108 A1 * | 10/2002 | Rodi | G01D 5/34738 | 250/231.14 |
| 2003/0141441 A1 * | 7/2003 | Kawano | G01D 5/38 | 250/231.13 |
| 2003/0155489 A1 * | 8/2003 | Yasuda | G01D 5/34715 | 250/225 |
| 2006/0279747 A1 * | 12/2006 | Tamiya | H01L 21/0272 | 356/616 |
| 2008/0185506 A1 * | 8/2008 | Makinouchi | G01D 5/34715 | 250/231.13 |
| 2008/0186491 A1 * | 8/2008 | Baxter | G01D 5/3473 | 356/364 |
| 2010/0315910 A1 * | 12/2010 | Lee | B82Y 10/00 | 369/13.11 |
| 2011/0141451 A1 * | 6/2011 | Yamaguchi | G01D 5/38 | 355/77 |
| 2012/0133701 A1 * | 5/2012 | Nakata | B41J 19/20 | 347/19 |
| 2013/0114062 A1 * | 5/2013 | Liesener | G01D 5/38 | 355/72 |
| 2013/0128255 A1 * | 5/2013 | Liu | G01D 5/34 | 355/72 |
| 2014/0311258 A1 * | 10/2014 | Oguchi | G01D 5/3473 | 73/862.324 |
| 2014/0360804 A1 * | 12/2014 | Oguchi | G01D 5/3473 | 180/446 |
| 2014/0374579 A1 * | 12/2014 | Goodwin | G01B 11/002 | 250/231.1 |
| 2015/0217451 A1 * | 8/2015 | Harada | B25J 9/1612 | 700/253 |
| 2015/0292870 A1 * | 10/2015 | Tamiya | G01D 5/34746 | 356/494 |
| 2016/0116757 A1 * | 4/2016 | Kimura | G01D 5/38 | 250/231.1 |
| 2017/0307419 A1 * | 10/2017 | Tomioka | G01D 5/345 | |
| 2018/0017373 A1 * | 1/2018 | Matsushita | G01B 9/02034 | |
| 2018/0170423 A1 * | 6/2018 | Wada | B62D 5/0481 | |
| 2018/0306605 A1 * | 10/2018 | Wada | G01D 5/345 | |
| 2019/0101418 A1 * | 4/2019 | Wada | G01D 5/345 | |

\* cited by examiner

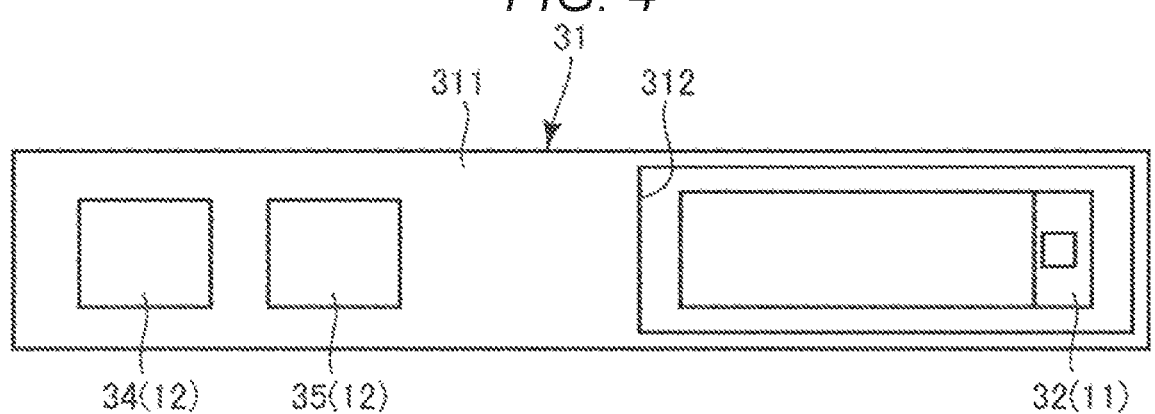
FIG. 4
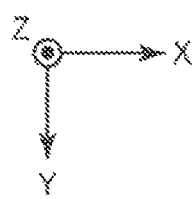

FIG. 10
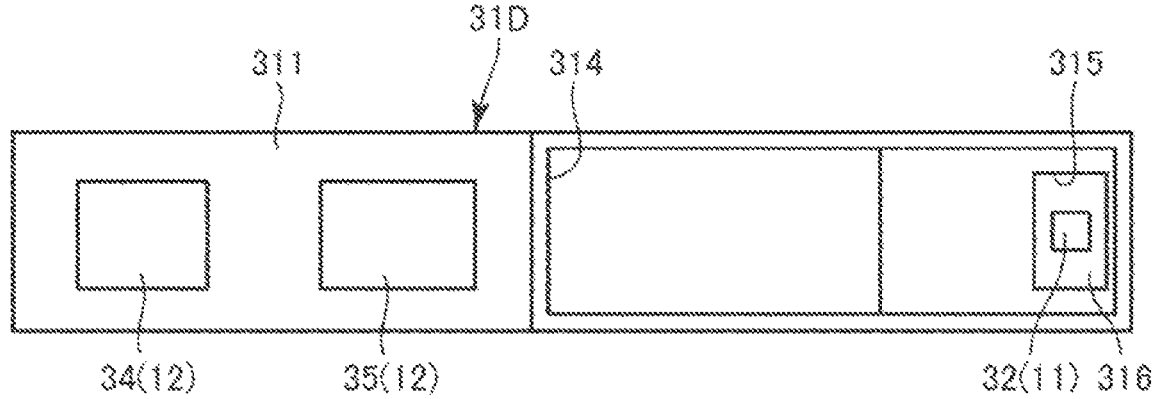
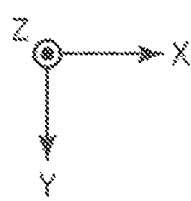

ENCODER, PRINTER, AND ROBOT

BACKGROUND

1. Technical Field

The present invention relates to an encoder, a printer, and a robot.

2. Related Art

An optical rotary encoder is generally known as a type of encoder (refer to, for example, JP-A-6-194189). The rotary encoder is used in, for example, a robot provided with a robot arm that has a pivotable joint portion and detects the rotation state of the joint portion such as the rotation angle, the rotation position, the number of rotations, and the rotation speed of the joint portion.

For example, the optical encoder that is disclosed in JP-A-6-194189 is provided with semiconductor laser, a lens, a beam splitter, a birefringence plate, two mirrors, a diffraction grating scale, and a photodetector. In this optical encoder, a light beam generated by the semiconductor laser and the lens is split into two light beams by the beam splitter. One of the light beams is transmitted through the birefringence plate and then reflected by one of the mirrors. The other light beam is reflected as it is by the other mirror. These reflected light beams intersect with each other on the diffraction grating scale, and the diffracted light beam from the diffraction grating scale is given to the photodetector. The photodetector detects the interference light intensity of the diffracted light beam.

The beam splitter and the two mirrors are separate bodies in the optical encoder disclosed in JP-A-6-194189. Accordingly, the optical encoder disclosed in JP-A-6-194189 has a problem in that the number of optical parts is large and the encoder is unlikely to be reduced in size as a result.

SUMMARY

An advantage of some aspects of the invention is to provide an encoder that can be reduced in size along with a printer and a robot provided with the encoder.

The invention can be implemented as the following application examples or forms.

An encoder according to an application example includes a light emitting portion emitting light, an optical element portion splitting the light into a first beam and a second beam, an optical scale receiving the first beam and the second beam from the optical element portion, and a light receiving portion receiving the first beam and the second beam from the optical scale and outputting a signal in accordance with intensity of the received light, in which the optical element portion includes a prism on which the light is incident, a beam splitter disposed on the prism and splitting the light incident on the prism into the first beam heading for the optical scale and the second beam heading for an inside of the prism, and a first mirror portion disposed on the prism and reflecting the second beam from the beam splitter toward the optical scale.

In this encoder, the beam splitter and the first mirror portion are disposed on the prism. Accordingly, the number of parts can be reduced and the encoder can be reduced in size.

In the encoder according to the application example, it is preferable that the optical element portion includes a second mirror portion disposed on the prism and reflecting the light such that the light is incident on the beam splitter.

With this configuration, the degree of freedom of disposition of the light emitting portion can be enhanced, and thus the encoder can be further reduced in size.

In the encoder according to the application example, it is preferable that the optical scale is pivotably disposed.

With this configuration, a rotary encoder can be realized.

In the encoder according to the application example, it is preferable that the optical scale has a scale portion including a polarizer or a phase difference plate.

With this configuration, a polarization-type encoder can be realized.

In the encoder according to the application example, it is preferable that the light emitting portion has a light emitting element emitting linearly polarized light.

With this configuration, a polarizing plate for generating linearly polarized light is not necessary and the encoder can be further reduced in size.

In the encoder according to the application example, it is preferable that the first beam and the second beam overlap each other, at least in part, in a plane of the optical scale.

With this configuration, even when the characteristics of the optical scale have an in-plane variation, detection accuracy is unlikely to be affected by the variation.

In the encoder according to the application example, it is preferable that the light receiving portion is on the same surface side as the light emitting portion with respect to the optical scale.

With this configuration, a reflective optical encoder can be realized. In addition, the encoder is more advantageous than a transmission-type encoder as the encoder can be reduced in size with more ease.

In the encoder according to the application example, it is preferable that a distance between the optical scale and the light emitting portion differs from a distance between the optical scale and the light receiving portion.

With this configuration, the optical paths of the first beam and the second beam can be shortened and an installation space can be ensured for the optical element portion at the same time. As a result, the encoder can be further reduced in size.

In the encoder according to the application example, it is preferable that the prism has a plurality of prisms joined to each other.

With this configuration, the optical element portion (prism) can be inexpensively formed in combination with an existing prism.

A printer according to an application example includes the encoder according to the application example.

This printer uses the small encoder, and thus the degree of freedom in design can be enhanced for the printer.

A robot according to an application example includes the encoder according to the application example.

This robot uses the small encoder, and thus the degree of freedom in design can be enhanced for the robot.

BRIEF DESCRIPTION OF THE DRAWINGS

The invention will be described with reference to the accompanying drawings, wherein like numbers reference like elements.

FIG. 4 is a plan view (diagram viewed from the Z axis direction) of a holder of the sensor unit illustrated in FIG. 3.

FIG. 10 is a plan view (diagram viewed from the Z axis direction) of a holder of the sensor unit illustrated in FIG. 9.

DESCRIPTION OF EXEMPLARY EMBODIMENTS

Hereinafter, an encoder, a printer, and a robot according to the invention will be described in detail based on preferred embodiments illustrated in accompanying drawings.

1. Encoder

First Embodiment

Figure 1:
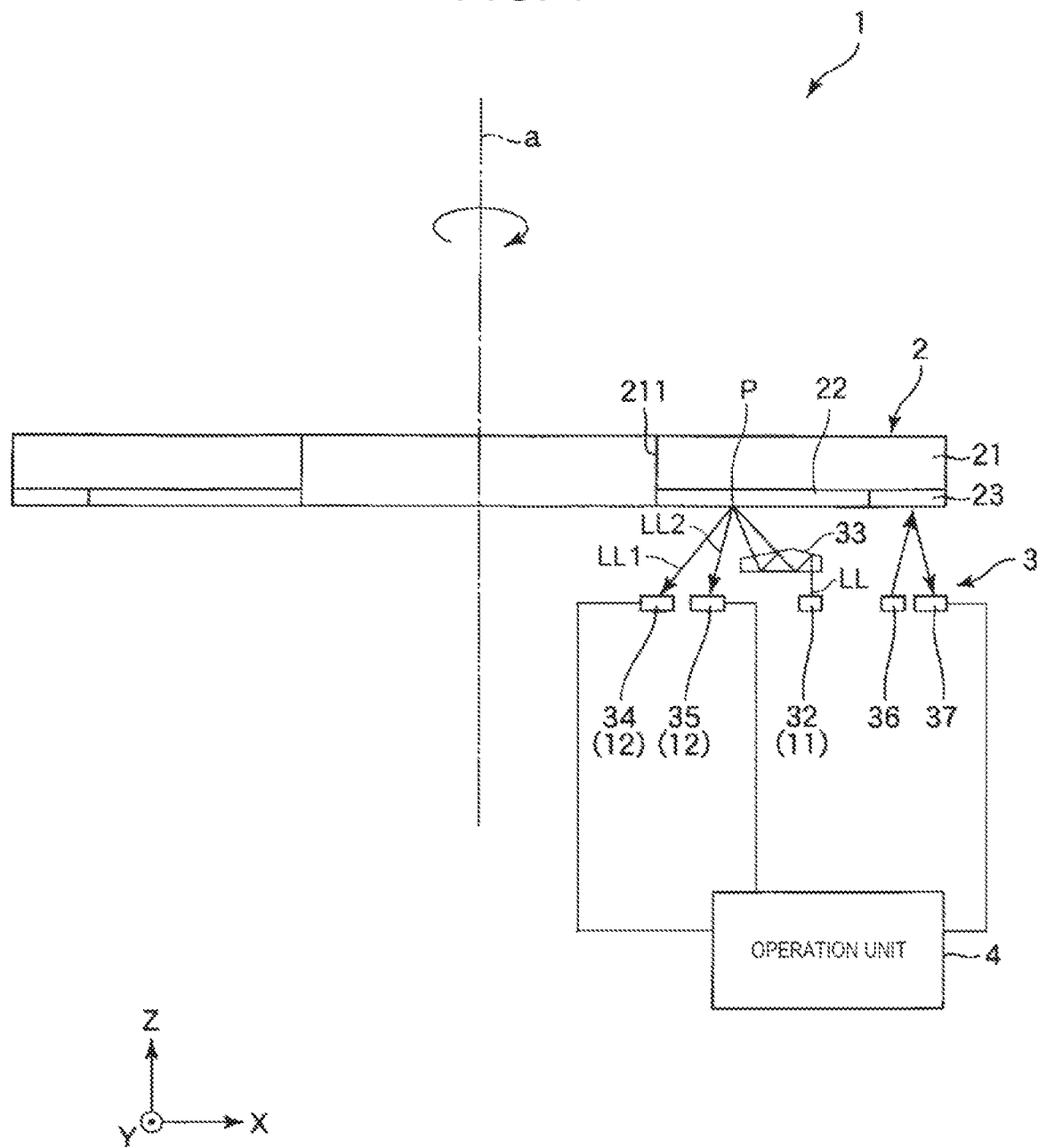
FIG. 1 is a sectional view (diagram cut along the XZ plane) schematically illustrating an encoder according to a first embodiment of the invention.
Figure 2:
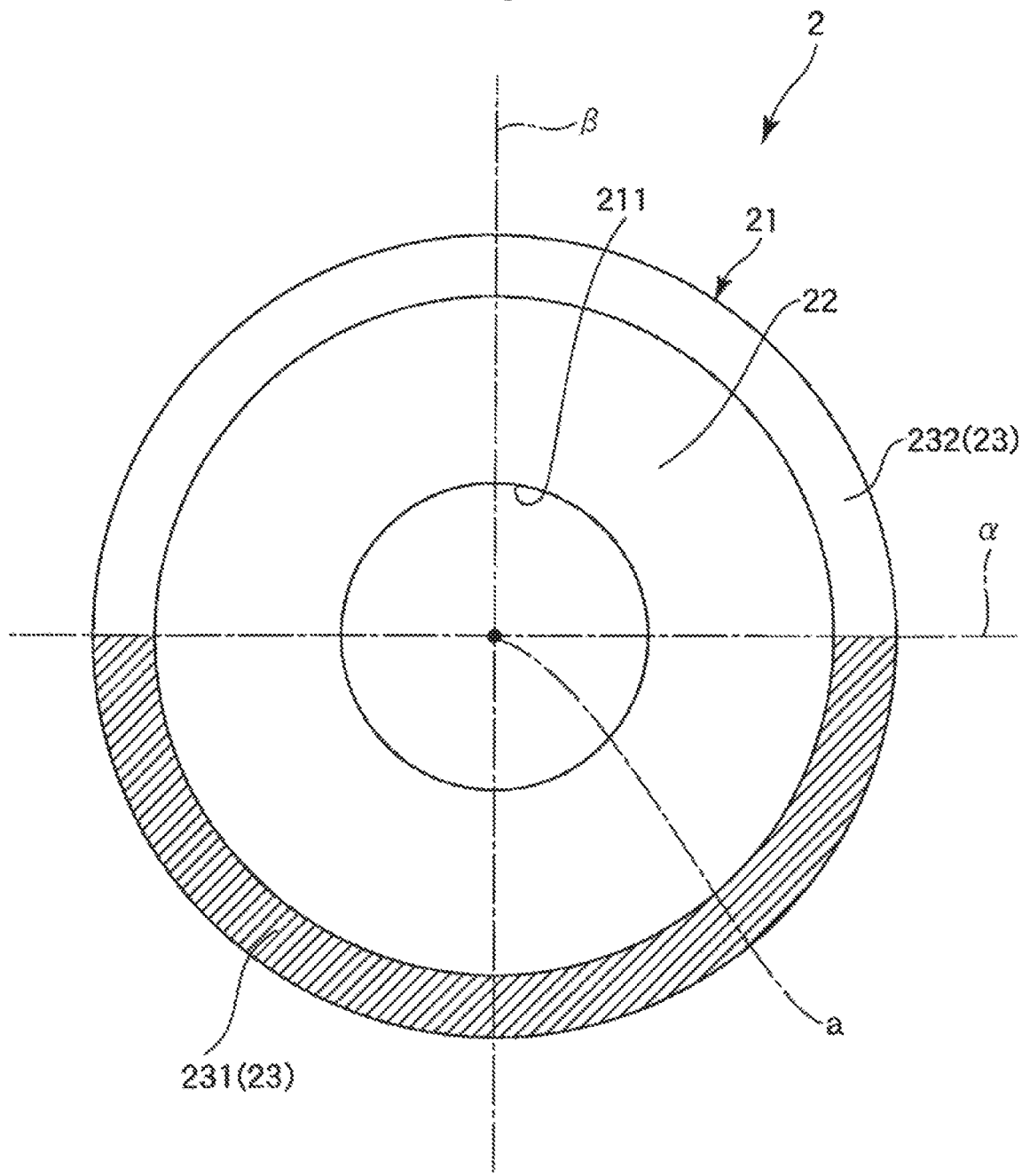
FIG. 2 is a plan view (diagram viewed from the Z axis direction) of an optical scale of the encoder illustrated in FIG. 1.
Figure 3:
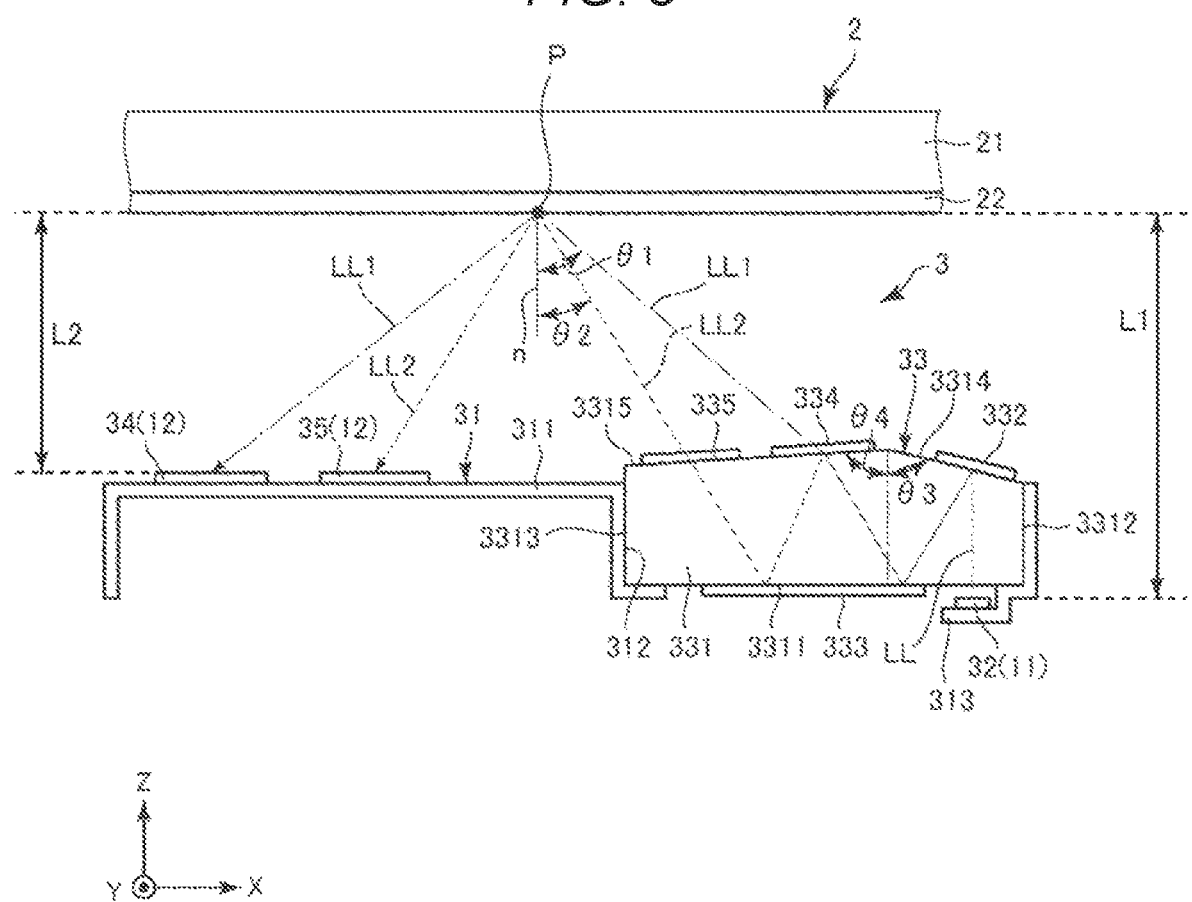
FIG. 3 is a schematic sectional view (diagram cut along the XZ plane) for showing a sensor unit (light emitting portion, light receiving portion, and optical element portion) of the encoder illustrated in FIG. 1.
Figure 5:
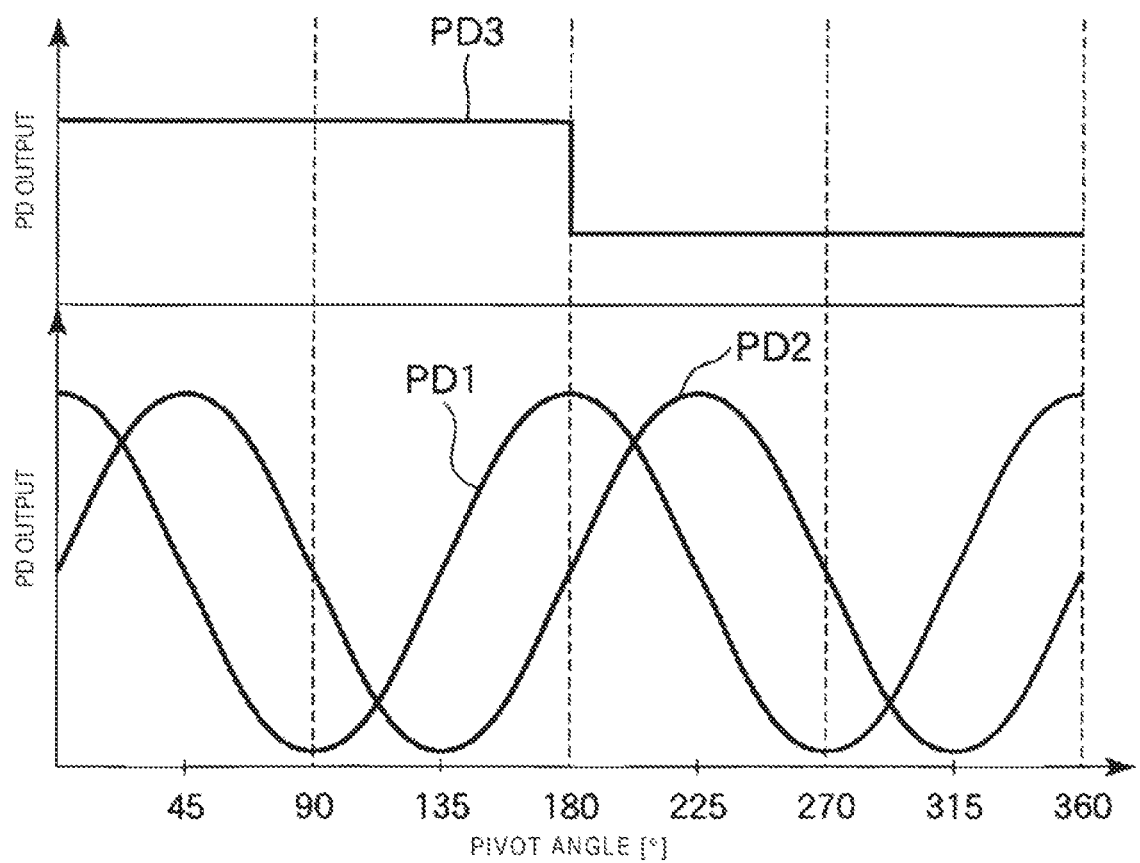
FIG. 5 is a graph illustrating a relationship between the rotation angle of the optical scale of the encoder illustrated in FIG. 1 and a current value (PD output) generated in the light receiving portion.

FIG. 1 is a sectional view (diagram cut along the XZ plane) schematically illustrating an encoder according to a first embodiment of the invention. FIG. 2 is a plan view (diagram viewed from the Z axis direction) of an optical scale of the encoder illustrated in FIG. 1. FIG. 3 is a schematic sectional view (diagram cut along the XZ plane) for showing a sensor unit (light emitting portion, light receiving portion, and optical element portion) of the encoder illustrated in FIG. 1. FIG. 4 is a plan view (diagram viewed from the Z axis direction) of a holder of the sensor unit illustrated in FIG. 3. FIG. 5 is a graph illustrating a relationship between the rotation angle of the optical scale of the encoder illustrated in FIG. 1 and a current value (PD output) generated in the light receiving portion.

For convenience, the X, Y, and Z axes, which are three axes orthogonal to each other, will be appropriately used in the following description. "+" and "−" respectively indicate the distal and proximal sides of the arrows indicating these axes in the drawings, and directions parallel to the X, Y, and Z axes will be referred to as the "X axis direction", the "Y axis direction", and the "Z axis direction", respectively. In addition, the +Z axis direction side and the −Z axis direction side will be referred to as the "upper" side and the "lower" side, respectively. Planes parallel to the X and Y axes, the X and Z axes, and the Y and Z axes will be referred to as the "XY plane", the "XZ plane", and the "YZ plane", respectively.

An encoder 1 illustrated in FIG. 1 is a reflective optical rotary encoder. The encoder 1 is provided with an optical scale 2 pivoting around a pivot axis along the Z axis direction, a sensor unit 3 fixedly installed and facing the optical scale 2, and an operation unit 4 electrically connected to the sensor unit 3.

The optical scale 2 has a substrate 21 along with a scale portion 22 and a 180° discrimination track 23 disposed on one surface (lower surface) of the substrate 21. In addition, the sensor unit 3 has light emitting elements 32 and 36, light receiving elements 34, 35, and 37, and an optical element portion 33 disposed between the light emitting element 32 and the scale portion 22.

In the encoder 1, the light emitting element 32 emits linearly polarized light LL and the optical element portion 33 splits the light LL into a first beam LL1 and a second beam LL2 and causes the light to be incident toward the scale portion 22 with the polarization direction of one of the beams shifted by 45° with respect to the other. Then, the light receiving element 34 receives the first beam LL1 reflected by the scale portion 22 and outputs a signal in accordance with the intensity of the received light. In addition, the light receiving element 35 receives the second beam LL2 reflected by the scale portion 22 and outputs a signal in accordance with the intensity of the received light.

Here, a polarizer constitutes the scale portion 22. The signal that is output from one of the light receiving elements 34 and 35 is an A phase signal that has a rotation angle of 180° of the optical scale 2 as one cycle. The signal that is output from the other one of the light receiving elements 34 and 35 is a B phase signal that has a rotation angle of 180° of the optical scale 2 as one cycle and has a phase shift of 45° with respect to the A phase signal. The light emitting element 32 constitutes a light emitting portion 11 emitting the light LL. The light receiving elements 34 and 35 constitute a light receiving portion 12 receiving the first beam LL1 and the second beam LL2 from the scale portion 22 and outputting a signal in accordance with the intensity of the received light.

In the present embodiment, the light emitting element 36 irradiates the 180° discrimination track 23 with light and the light receiving element 37 receives the light reflected by the 180° discrimination track 23 and outputs a signal in accordance with the intensity of the received light. Here, the signal that is output from the light receiving element 37 is a 180° discrimination signal for discriminating (distinguishing) the pivot state of the optical scale 2 from a state with a difference of 180°.

The operation unit 4 determines the pivot state (pivot, angle, pivot speed, pivot direction, and so on) of the optical scale 2 based on the signals (A phase signal and B phase signal) from the light receiving elements 34 and 35 and the signal (180° discrimination signal) from the light receiving element 37. The 180° discrimination track 23 can be omitted in a case where the encoder 1 is used as an incremental encoder.

Each part of the encoder 1 will be described in detail below.

Optical Scale

As illustrated in FIG. 2, the optical scale 2 has a disk shape and a hole 211 penetrating the optical scale 2 in the thickness direction of the optical scale 2 is formed in the middle portion of the optical scale 2. The optical scale 2 is used after being attached to a member (not illustrated) pivoting around the pivot axis a. As described above, the optical scale 2 has the substrate 21 along with the scale portion 22 and the 180° discrimination track 23 disposed on one surface of the substrate 21.

On one surface (lower surface in FIG. 1) of the substrate 21, the scale portion 22 and the 180° discrimination track 23 are disposed side by side in this order from the center side of the substrate 21 toward the outer peripheral side of the substrate 21. The substrate 21 can be omitted in a case where the scale portion 22 and the 180° discrimination track 23 are integrally configured.

A polarizer constitutes the scale portion 22. The scale portion 22 has polarization characteristics to selectively transmit P-polarized light and reflect S-polarized light. For example, the scale portion 22 has a polarization pattern (wire grid) configured by a plurality of wires reflecting the light from the light emitting element 32 being arranged in parallel at intervals, reflects light with vibration in a direction parallel to the direction in which the wires extend, and transmits light with vibration in a direction perpendicular to the direction in which the wires extend. Here, the substrate 21 has light absorbing properties or a light absorbing portion such as an optical thin film that has light absorbing properties is disposed between the substrate 21 and the scale portion 22. Accordingly, the light that is reflected by the scale portion 22 is received by the above-described light receiving element 34 or 35 and the light that is transmitted through the scale portion 22 is not received by the light receiving elements 34 and 35. Examples of the material constituting the polarization pattern include aluminum (Al), copper (Cu), chromium (Cr), gold (Au), iron (Fe), platinum (Pt), and a metal material such as alloys thereof. In other words, the scale portion 22 has a plurality of linearly extending metal wires. The scale portion 22 may be formed by, for example, a known film forming method or processing of a sheet- or plate-shaped member based on etching or the like.

A plurality of wires having light absorbing properties also may constitute the polarization pattern. In this case, the substrate 21 is light-reflective or a reflecting portion such as a light-reflective metal film is disposed between the substrate 21 and the scale portion 22, and the light that is transmitted through the scale portion is reflected by the substrate 21 or the reflecting portion and received by the light receiving element 34 or 35. The scale portion 22 is not limited to the configuration that uses a wire grid polarizing plate. For example, an organic polarizing plate using iodine or a dichroic dye may be used instead. In this case, the light that is reflected between the substrate 21 and the scale portion 22 is received by the light receiving element 34 or 35.

The 180° discrimination track 23 is disposed along a circle that has the pivot axis a at the center thereof. Two regions 231 and 232 constitute the 180° discrimination track 23. The 180° discrimination track 23 is divided into the regions 231 and 232 (lower and upper regions in FIG. 2) by a line segment α passing through the pivot axis a when viewed from a direction along the pivot axis a or the Z axis (hereafter, also referred to as "in a plan view"). In other words, the region 231 is disposed in a range of 180° and the region 232 is disposed in the other range of 180° in the entire 360° range in the circumferential direction of the 180° discrimination track 23.

The two regions 231 and 232 differ in reflectance from each other. Specifically, the region 231, which is one of the two regions 231 and 232, has reflectivity with respect to the light from the light emitting element 36 and the region 232, which is the other one of the two regions 231 and 232, has optical transparency with respect to the light from the light emitting element 36. Accordingly, the reflectance of the region 231 with respect to the light from the light emitting element 36 is higher than the reflectance of the region 232 with respect to the light from the light emitting element 36.

The region 231 is provided with a thin film reflecting the light from the light emitting element 36 and the region 232 is not provided with the thin film. Examples of the material constituting the thin film disposed in the region 231 include a metal material similar to the material of the polarization pattern of the scale portion 22 described above. The thin film of the region 231 can be, for example, formed by a known film forming method and collectively with the polarization pattern of the scale portion 22 described above. The region 232 may be provided with a thin film lower in reflectance with respect to the light from the light emitting element 36 than the thin film of the region 231 (thin film antireflective or absorbent with respect to the light from the light emitting element 36), examples of which include a black coating film and a dielectric multilayer thin film (optical multilayer thin film).

Sensor Unit

The sensor unit 3 is used after being attached to a member (not illustrated) not pivoting around the pivot axis a. As described above, the sensor unit 3 has the light emitting elements 32 and 36, the light receiving elements 34, 35, and 37, and the optical element portion 33 disposed between the light emitting element 32 and the scale portion 22. The light emitting element 32, the light receiving elements 34 and 35, and the optical element portion 33 are held by a holder 31 as illustrated in FIG. 3, although this is not illustrated in FIG. 1. As a result, positioning errors of the light emitting element 32, the light receiving elements 34 and 35, and the optical element portion 33 can be reduced. In addition, the light emitting element 36 and the light receiving element 37 are supported by a support member (not illustrated) such that the positions of the light emitting element 36 and the light receiving element 37 with respect to the holder 31 are fixed.

The holder 31 has a light receiving element installation portion 311 where the light receiving elements 34 and 35 are installed, an optical element installation portion 312 where the optical element portion 33 is installed, and a light emitting element installation portion 313 where the light emitting element 32 is installed.

The light receiving element installation portion 311 has a plate shape along the XY plane. The light receiving elements 34 and 35 are fixed by an adhesive or the like to the optical scale 2 side surface of the light receiving element installation portion 311. The optical element installation portion 312 is a recessed portion recessed to the −Z axis direction side beyond the light receiving element installation portion 311 to have a shape matching the outer shape of the optical element portion 33. The optical element portion 33 is disposed in the optical element installation portion 312. Here, the optical element portion 33 is fixed with respect to the holder 31 by engagement with the optical element installation portion 312. In addition, the optical element portion 33 may be fixed with respect to the holder 31 by means of an adhesive or the like if necessary. The light emitting element installation portion 313 is disposed in the bottom portion of the optical element installation portion 312 (recessed portion) and has a plate shape along the XY plane. The light emitting element 32 is fixed by an adhesive or the like to the optical scale 2 side surface of the light emitting element installation portion 313.

The positional relationship of the light emitting element 32, the light receiving elements 34 and 35, and the optical element portion 33 can be fixed by means of the holder 31. As illustrated in FIGS. 3 and 4, in the present embodiment, the light emitting element 32, the light receiving element 35, and the light receiving element 34 are arranged side by side in this order from the +X axis direction side toward the −X axis direction side (from the outer peripheral side of the substrate 21 toward the center of the substrate 21 in a plan view) and disposed on the same straight line along the X axis direction. The holder 31 is optional and can be omitted. In this case, for example, the light emitting elements 32 and 36 and the light receiving elements 34, 35, and 37 may be mounted on the same wiring substrate and the optical element portion 33 may be fixed via any member with respect to the wiring substrate.

The light emitting element 32 (light emitting portion 11) is, for example, surface emitting laser (vertical cavity surface emitting laser, VCSEL). The light emitting element 32 has a function to emit the linearly polarized light LL as a result of energization from a drive circuit (not illustrated). In this manner, the light emitting element 32 constitutes the light emitting portion 11 emitting the light LL. Here, the "linearly polarized light" means light that has a vibration plane of electromagnetic waves (light) in one plane, that is, light with a constant electric field (or magnetic field) vibration direction. Although the light that is emitted by the light emitting element 32 may include a component other than a linearly polarized light component and have a fluctuating polarization direction, each of the component other than the linearly polarized light component and the fluctuation of the polarization direction being as small as possible (each of the amount of the other component with respect to a desired linearly polarized light component and the fluctuation angle of the polarization direction being 5% or less) is preferable in this case.

In this manner, the light emitting portion 11 has the light emitting element 32 emitting linearly polarized light. As a result, a polarizing plate for generating linearly polarized light is not necessary and the encoder 1 can be further reduced in size.

The light emitting portion 11 is not limited to a configuration in which surface emitting laser is used as the light emitting element 32 insofar as the light emitting portion 11 is capable of emitting the linearly polarized light LL. In an alternative configuration, for example, a light emitting diode may be used as the light emitting element 32 and a polarizing plate may be disposed between the light emitting element 32 and the optical element portion 33. In addition, if necessary, a lens such as a collimator lens may be disposed between the light emitting element 32 and the optical element portion 33 so that the light LL from the light emitting element 32 is parallel light.

The optical element portion 33 has a function to split the light LL from the above-described light emitting element 32 into two beams, that is, the first beam LL1 and the second beam LL2, a function to irradiate the same irradiation point P of the scale portion 22 with the first beam LL1 and the second beam LL2, and a function to shift the polarization direction of one of the first beam LL1 and the second beam LL2 by 45° with respect to the polarization direction of the other.

The optical element portion 33 according to the present embodiment has a prism 331 along with mirror portions 332 and 333, a beam splitter 334, and a phase difference plate 335 disposed on the prism 331.

The prism 331 is made of an optical material such as a resin material, a glass material, and a crystal material and has optical transparency. As illustrated in FIG. 3, the prism 331 has a surface 3311 (lower surface in FIG. 3) along the XY plane, two surfaces 3312 and 3313 (left and right surfaces in FIG. 3) along the YZ plane, and two surfaces 3314 and 3315 (upper surfaces in FIG. 3) parallel to the Y axis and tilted with respect to the XY and YZ planes.

The +X axis direction side end portion of the surface 3311 faces the light emitting element 32. As a result, the light LL from the light emitting element 32 can be incident into the prism 331 via the surface 3311. Each of the two surfaces 3312 and 3313 abuts against a wall surface of the optical element installation portion 312 of the holder 31 described above. As a result, the position of the prism 331 in the X axis direction and the posture of the prism 331 in the XY plane can be regulated. When viewed from the Z axis direction, the surface 3314 is disposed at a position overlapping the light emitting element 32. This surface 3314 is tilted with respect to the XY and YZ planes such that the distance between the surface 3314 and the surface 3311 decreases toward the +X axis direction side. The tilt angle (angle θ3) of the surface 3314 with respect to the YZ plane is, for example, approximately 75°. The surface 3315 is disposed on the −X axis direction side with respect to the surface 3314 described above. This surface 3315 is tilted with respect to the XY and YZ planes such that the distance between the surface 3315 and the surface 3311 decreases toward the −X axis direction side. The tilt angle (angle θ4) of the surface 3315 with respect to the YZ plane is, for example, approximately 85°.

The prism 331 can be inexpensively obtained by, for example, optical bonding being performed on a right triangle prism that has the angle θ3 and a right triangle prism that has the angle θ4 and processing being performed on the bonded body so that unnecessary parts are removed. It can be said that the prism 331 has a plurality of prisms joined to each other with the part that is indicated by the two-dot chain line in FIG. 3 used as a joining portion. As a result, the optical element portion 33 (especially the prism 331) can be inexpensively formed in combination with an existing prism. In addition, as a result of the processing for removing the unnecessary parts, the prism 331 can be smaller in size than two prisms simply bonded with each other.

The mirror portion 332 (second mirror portion) is disposed on the surface 3314 of the prism 331 described above and is along the surface 3314, and thus the mirror portion 332 is parallel to the Y axis and tilted with respect to the XY and YZ planes. The mirror portion 332 is made of, for example, a dielectric multilayer thin film (optical multilayer thin film) or a metal thin film for a reflectance of 100%. The mirror portion 332 reflects the light LL incident into the prism 331 via the surface 3311 toward the surface 3311.

The mirror portion 333 (the left part in FIG. 3 being a first mirror portion and the right part in FIG. 3 being the second mirror portion) is disposed along the XY plane, in a state where the part of the surface 3311 that faces the light emitting element 32 is exposed and such that the light LL is allowed to be incident into the prism 331, on the surface 3311 of the prism 331 described above. The mirror portion 333 is made of, for example, a dielectric multilayer thin film (optical multilayer thin film) or a metal thin film for a reflectance of almost 100%. The mirror portion 333 reflects the light LL reflected by the mirror portion 332 described above toward the surface 3315. In addition, the mirror portion 333 reflects the second beam LL2 from the beam splitter 334 (described below) toward the surface 3315.

The beam splitter 334 is disposed on the +X axis direction side part of the surface 3315 of the prism 331 and is along the surface 3315, and thus the beam splitter 334 is parallel to the Y axis and tilted with respect to the XY and YZ planes. The beam splitter 334 is made of, for example, a dielectric multilayer thin film (optical multilayer thin film) or a metal thin film for a reflectance of 50% and a transmittance of 50% (substantially no absorption). The beam splitter 334 transmits part of the light LL from the mirror portion 333 into the first beam LL1 and reflects the rest into the second beam LL2. The reflectance-to-transmittance ratio is not limited to 1:1.

The phase difference plate 335 is disposed on the −X axis direction side (side opposite to the surface 3314 with respect to the beam splitter 334) part of the surface 3315 of the prism 331 and is along the surface 3315, and thus the phase difference plate 335 is parallel to the Y axis and tilted with respect to the XY and YZ planes. In the present embodiment, the phase difference plate 335 is a λ/2 phase difference plate (optical element causing a phase difference (optical path difference) of ½ wavelength in two orthogonal polarized light components) and shifts the polarization direction of the second beam LL2 from the mirror portion 333 by 45° with respect to the first beam LL1. The phase difference plate 335 may also be disposed on the surface of the beam splitter 334 that is on the side opposite to the prism 331. In this case, the phase difference plate 335 is set such that the shift in phase of the signals from the light receiving elements 34 and 35 is the same as in the case of the above-described configuration.

In the optical element portion 33 configured as described above, the light LL from the light emitting element 32 is incident into the prism 331 via the surface 3311. The light LL incident into the prism 331 is sequentially reflected by the mirror portions 332 and 333 and then split into the first beam LL1 and the second beam LL2 by the beam splitter 334. The first beam LL1 heads for the irradiation point P of the scale portion 22. The second beam LL2 heads for the irradiation point P of the scale portion 22 by being reflected by the mirror portion 333. During the course, the second beam LL2 passes through the phase difference plate 335, which results in a difference in phase from the first beam LL1.

Here, the first beam LL1 is tilted at an angle θ1 with respect to a normal n (line segment along the Z axis direction) of the scale portion 22 and incident on the scale portion 22. The angle θ1 is approximately 45° in a case where, for example, the prism 331 is made of BK7 (glass material), the angle θ3 is 75°, and the angle θ4 is 85°. The second beam LL2 is tilted at an angle θ2 with respect to the normal n (line segment along the Z axis direction) of the scale portion 22 and incident on the scale portion 22. The angle θ2 is approximately 30° in a case where, for example, the prism 331 is made of BK7, the angle θ3 is 75°, and the angle θ4 is 85°.

Each of the light receiving elements 34 and 35 (light receiving portion 12) is, for example, a photodiode using GaAs or Si and is electrically connected to the operation unit 4. The light receiving element 34 has a function to receive the first beam LL1 reflected by the scale portion 22 and output a current corresponding to the intensity of the received light as a detection signal. The light receiving element 35 has a function to receive the second beam LL2 reflected by the scale portion 22 and output a current corresponding to the intensity of the received light as a detection signal. In this manner, the light receiving elements 34 and 35 constitute the light receiving portion 12 receiving the first beam LL1 and the second beam LL2 from the scale portion 22 and outputting a signal in accordance with the intensity of the received light.

In addition, the light emitting element 36 illustrated in FIG. 1 may be, for example, surface emitting laser or a light emitting diode and the emitted light may or may not be polarized. The light emitting element 36 irradiates the 180° discrimination track 23 with light as a result of energization from the drive circuit (not illustrated).

The light receiving element 37 illustrated in FIG. 1 is, for example, a photodiode using GaAs or Si and is electrically connected to the operation unit 4. The light receiving element 37 has a function to receive the light that is reflected by the 180° discrimination track 23 and output a current corresponding to the intensity of the received light as a detection signal.

The operation unit 4 illustrated in FIG. 1 is configured to include, for example, a processor such as a central processing unit (CPU) and a memory such as a static random access memory (SRAM). The operation unit 4 has a function to determine the pivot state of the optical scale 2 by using the signals from the light receiving elements 34, 35, and 37. Examples of the pivot state include a pivot position, the pivot angle, the pivot speed, and the pivot direction. The function of the operation unit 4 is realized by the processor appropriately reading and executing a program stored in the memory.

As described above, the first beam LL1 and the second beam LL2 resulting from the splitting of the light LL emitted by the light emitting element 32 are linearly polarized and the polarization direction of one is shifted by 45° with respect to that of the other. The scale portion 22 irradiated with the first beam LL1 and the second beam LL2 has polarization characteristics to selectively transmit P-polarized light and reflect S-polarized light.

The scale portion 22 causes the reflectance of each of the first beam LL1 and the second beam LL2 with which the scale portion 22 is irradiated in the scale portion 22 to change in accordance with the pivot angle of the optical scale 2. Accordingly, the signals (PD1 and PD2 in FIG. 5) from the light receiving elements 34 and 35 receiving the first beam LL1 and the second beam LL2 have a current value (PD output) changing along a sine wave in accordance with the pivot angle (rotation angle) of the optical scale 2 as illustrated in FIG. 5. Still, the first beam LL1 and the second beam LL2 have different polarization directions as described above, and thus the signals from the light receiving elements 34 and 35 have a phase shift of 45° in accordance with this shift in polarization direction.

The signal from one of the light receiving elements 34 and 35 is the A phase signal and the signal from the other is the B phase signal that has a phase shift of 45° with respect to the A phase signal. By the A phase signal and the B phase signal being used in combination with each other, angle discrimination can be performed within a range in which the pivot angle of the optical scale 2 is 0 to $\pi$ or $\pi$ to $2\pi$. Still, the signals from the light receiving elements 34 and 35 have the same waveform in the ranges of 0 to $\pi$ and $\pi$ to $2\pi$. Accordingly, a time when the optical scale 2 has a pivot angle of 0° to 180° and a time when the optical scale 2 has a pivot angle of 180° to 360° cannot be distinguished from each other with the signal (A phase signal and B phase signal) from the light receiving element 34 alone.

When it comes to the light with which the 180° discrimination track 23 is irradiated, the reflectance of the 180° discrimination track 23 changes in a binary manner in accordance with the pivot angle of the optical scale 2. Accordingly, the signal (PD3 in FIG. 5) from the light receiving element 37 has a current value (PD output) changing in a binary manner in accordance with the pivot angle (rotation angle) of the optical scale 2 as illustrated in FIG. 5. Here, the signal from the light receiving element 37 has different values in the ranges of 0 to $\pi$ and $\pi$ to $2\pi$. Accordingly, a time when the optical scale 2 has a pivot angle of 0° to 180° and a time when the optical scale 2 has a pivot angle of 180° to 360° can be discriminated from each other by means of the signal (180° rotation discrimination signal) from the light receiving element 37.

As described above, the encoder 1 is provided with the light emitting portion 11 emitting the light LL, the optical element portion 33 splitting the light LL into the first beam LL1 and the second beam LL2, the optical scale 2 receiving the first beam LL1 and the second beam LL2 from the optical element portion 33, and the light receiving portion 12 receiving the first beam LL1 and the second beam LL2 from the optical scale 2 and outputting a signal in accordance with the intensity of the received light. The optical element portion 33 has the prism 331 on which the light LL is incident, the beam splitter 334 disposed on the prism 331 and splitting the light LL incident on the prism 331 into the first beam LL1 heading for the optical scale 2 and the second beam LL2 heading for the inside of the prism 331, and the mirror portion 333 as the first mirror portion disposed on the prism 331 and reflecting the second beam LL2 from the beam splitter 334 toward the optical scale 2.

With this encoder 1, the light LL is split into the first beam LL1 and the second beam LL2 by the optical element portion 33 while heading for the scale portion 22 from the light emitting portion 11, and thus a single light source (light emitting element 32 in the present embodiment) is capable of constituting the light emitting portion 11. Accordingly, a decline in detection accuracy attributable to an output variation between two light sources, which occurs in a case where two light sources (light emitting elements) are used, can be addressed.

In the encoder 1, the beam splitter 334 and the mirror portion 333 (first mirror portion) are disposed on the prism 331 (that is, the prism 331, the beam splitter 334, and the mirror portion 333 are integrated as the optical element portion 33). Accordingly, the number of parts can be reduced and the encoder 1 can be reduced in size. In addition, the disposition of the beam splitter 334 and the mirror portion 333 can be highly accurately regulated with the surface of the prism 331, and thus additional advantages can be obtained with assembly or the like of the encoder 1 simplified and fluctuations in terms of detection characteristics reduced.

As described above, in the optical element portion 33, the light LL incident on the prism 331 is sequentially reflected by the mirror portions 332 and 333 and incident on the beam splitter 334. Accordingly, it can be said that the optical element portion 33 has the mirror portions 332 and 333 as the second mirror portion disposed on the prism 331 and reflecting the light LL from the light emitting portion 11 to cause the light LL to be incident on the beam splitter 334 (right side in FIG. 3 being the second mirror portion in the mirror portion 333). As a result, the degree of freedom of disposition of the light emitting portion 11 can be higher than in a case where the light LL from the light emitting portion 11 is directly incident on the beam splitter 334, and thus the encoder 1 can be further reduced in size.

As described above, the first beam LL1 and the second beam LL2 irradiate the irradiation point P of the scale portion 22 together. In this manner, the first beam LL1 and the second beam LL2 overlap each other, at least in part, in the plane of the optical scale 2. As a result, even when the characteristics of the optical scale 2 have an in-plane variation, detection accuracy is unlikely to be affected by the variation. As a result, the detection accuracy of the encoder 1 can be improved.

Although the spot diameters and the spot shapes of the first beam LL1 and the second beam LL2 on the scale portion 22 may or may not be identical to each other in a case where the same irradiation point P is included in the plane of the scale portion 22 as in the present embodiment, the spot diameter ratio is preferably 0.5 to 1.5 and more preferably 0.8 to 1.2 in a case where the spot diameters are different. In addition, it is preferable that the optical axis (central axis) of each of the first beam LL1 and the second beam LL2 matches the irradiation point P as much as possible. In addition, it is preferable that one of the first beam LL1 and the second beam LL2 overlaps the other by at least 50% in the plane of the scale portion 22 and it is more preferable that one of the first beam LL1 and the second beam LL2 overlaps the other by at least 80% in the plane of the scale portion 22.

In addition, as described above, the light emitting portion 11 is installed in the light emitting element installation portion 313, which is at a position recessed beyond the light receiving element installation portion 311 of the holder 31 where the light receiving portion 12 is installed. Accordingly, a distance L1 between the optical scale 2 and the light emitting portion 11 differs from a distance L2 between the optical scale 2 and the light receiving portion 12 (especially, the relationship of L1>L2 is satisfied). As a result, the optical paths of the first beam LL1 and the second beam LL2 (distances between the irradiation point P and the light receiving elements 34 and 35) can be shortened and an installation space can be ensured for the optical element portion 33 at the same time. As a result, the encoder 1 can be further reduced in size. In a case where the distance L1 between the optical scale 2 and the light emitting portion 11 is equal to the distance L2 between the optical scale 2 and the light receiving portion 12, the distance L2 increases and the sensor unit 3 increases in size in the X axis direction as well. This is because the first beam LL1 and the second beam LL2 are incident with respect to the plane of the optical scale 2 in a tilted state.

The optical scale 2 is pivotably disposed in the encoder 1 according to the present embodiment. As a result, the encoder 1 can be realized as a rotary encoder.

The optical scale 2 has the scale portion 22 and a polarizer constitutes the scale portion 22. As a result, the encoder 1 can be realized as a polarization-type encoder.

The light receiving portion 12 is on the same surface side as the light emitting portion 11 with respect to the optical scale 2. As a result, the encoder 1 can be realized as a reflective optical encoder. In addition, the encoder 1 is more advantageous than a transmission-type encoder as the encoder 1 can be reduced in size with more ease. The encoder 1 can be realized as a transmission-type encoder when the light receiving portion 12 is disposed on the side opposite to the light emitting portion 11 with respect to the optical scale 2. In this case, the optical scale 2 may be configured to have optical transparency with respect to the first beam LL1 and the second beam LL2.

Second Embodiment

Figure 6:
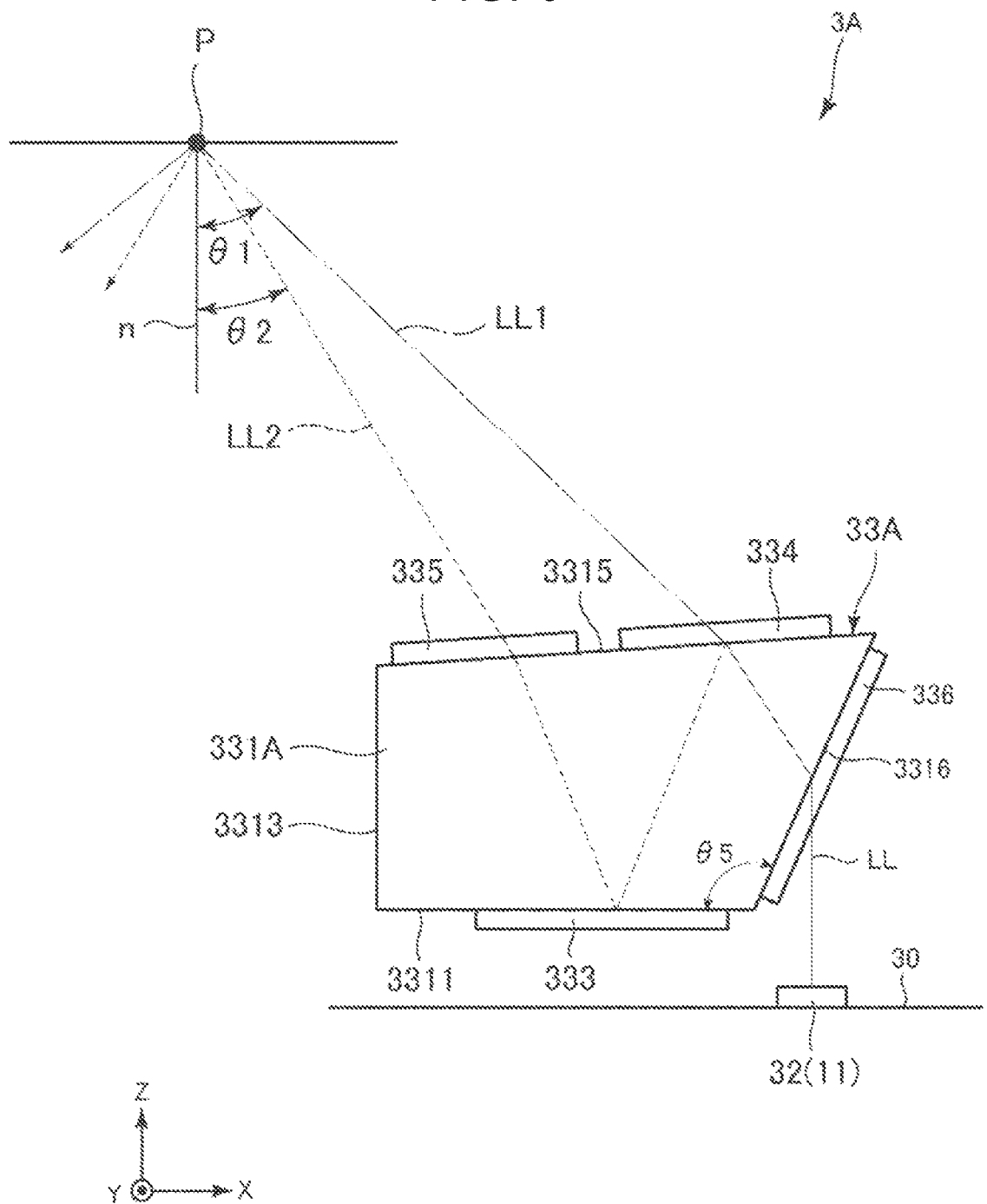
FIG. 6 is a schematic sectional view (diagram cut along the XZ plane) illustrating a sensor unit (light emitting portion and optical element portion) of an encoder according to a second embodiment of the invention.

FIG. 6 is a schematic sectional view (diagram cut along the XZ plane) illustrating a sensor unit (light emitting portion and optical element portion) of an encoder according to a second embodiment of the invention.

The following description of the second embodiment will focus on how the second embodiment differs from the first embodiment with description of similar matters omitted. In FIG. 6, the same reference numerals will be used to refer to the same configurations as in the first embodiment.

A sensor unit 3A illustrated in FIG. 6 is provided with an optical element portion 33A. The optical element portion 33A has a prism 331A along with the mirror portion 333, the beam splitter 334, the phase difference plate 335, and an antireflection film 336 disposed on the prism 331A.

The prism 331A has the surface 3311 (lower surface in FIG. 6) along the XY plane, the surface 3313 (left surface in FIG. 6) along the YZ plane, and the two surfaces 3315 and 3316 (upper and right surfaces in FIG. 6) parallel to the Y axis and tilted with respect to the XY and YZ planes.

The surface 3316 is disposed on the +Z axis direction side with respect to the light emitting element 32 and tilted to face the light emitting element 32 side. As a result, the light LL from the light emitting element 32 can be incident into the prism 331A via the surface 3316. The tilt angle (angle θ5) of the surface 3316 with respect to the XY plane (surface 3311) is, for example, approximately 113°.

The antireflection film 336 is disposed on the surface 3316 of the prism 331 described above. The antireflection film 336 is made of, for example, a dielectric multilayer thin film (optical multilayer thin film), has antireflection properties with respect to the light LL, and causes the light LL from the light emitting element 32 to be incident into the prism 331A.

In the optical element portion 33A configured as described above, the light LL from the light emitting element 32 is incident into the prism 331A via the antireflection film 336 and the surface 3316. The light LL incident into the prism 331A is split into the first beam LL1 and the second beam LL2 by the beam splitter 334. The first beam LL1 heads for the irradiation point P of the scale portion 22. The second beam LL2 heads for the irradiation point P of the scale portion 22 by being reflected by the mirror portion 333. During the course, the second beam LL2 passes through the phase difference plate 335, which results in a difference in phase from the first beam LL1.

Here, the angle θ1 is approximately 45° and the angle θ2 is approximately 30° in a case where, for example, the prism 331A is made of BK7 and the angle θ5 is 113°.

The same effect as in the first embodiment described above can be achieved with the second embodiment described above.

Third Embodiment

Figure 7:
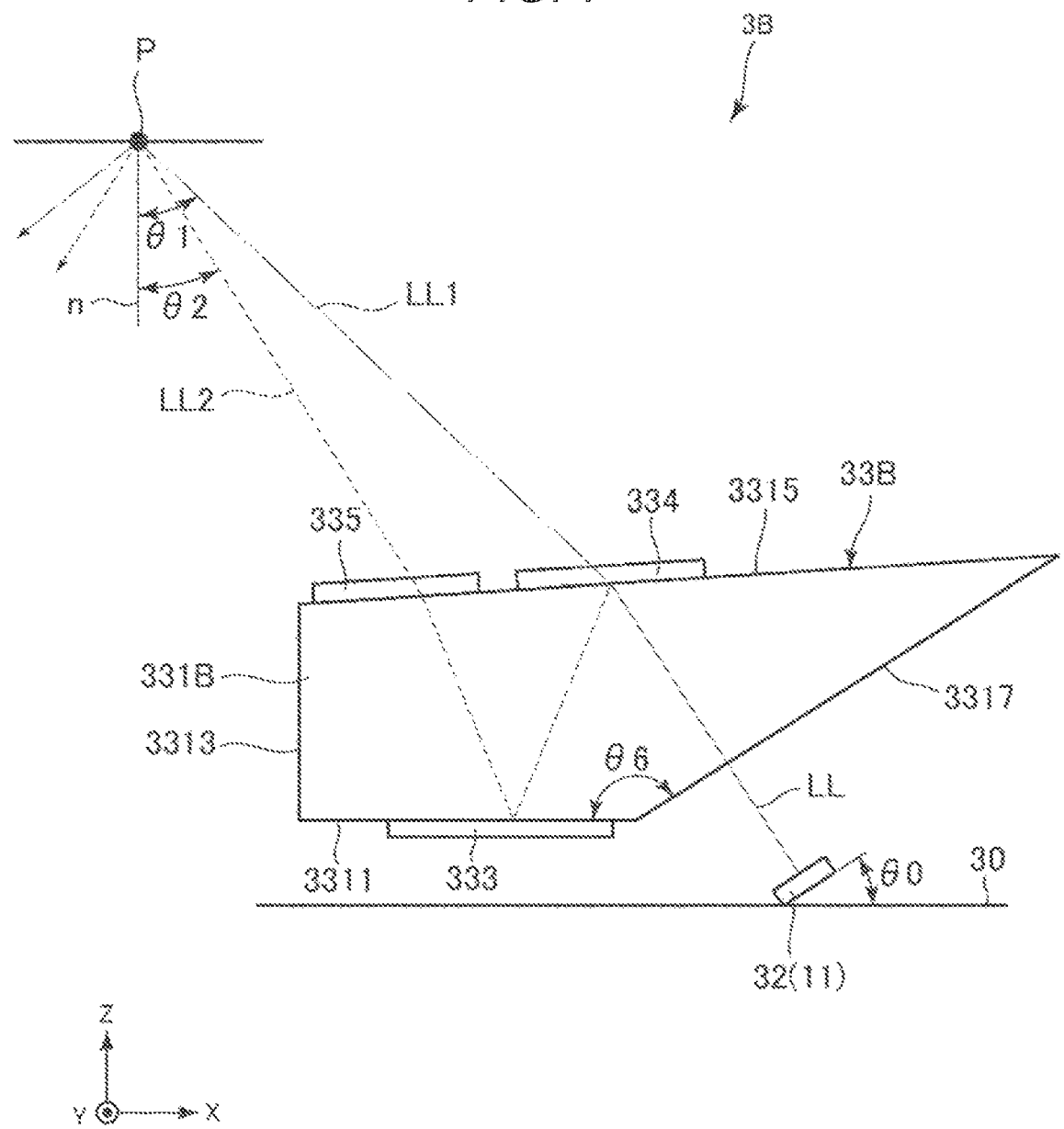
FIG. 7 is a schematic sectional view (diagram cut along the XZ plane) illustrating a sensor unit (light emitting portion and optical element portion) of an encoder according to a third embodiment of the invention.

FIG. 7 is a schematic sectional view (diagram cut along the XZ plane) illustrating a sensor unit (light emitting portion and optical element portion) of an encoder according to a third embodiment of the invention.

The following description of the third embodiment will focus on how the third embodiment differs from the above-described embodiments with description of similar matters omitted. In FIG. 7, the same reference numerals will be used to refer to the same configurations as in the above-described embodiments.

A sensor unit 3B illustrated in FIG. 7 is provided with an optical element portion 33B. The optical element portion 33B has a prism 331B along with the mirror portion 333, the beam splitter 334, and the phase difference plate 335 disposed on the prism 331B.

The prism 331B has the surface 3311 (lower surface in FIG. 7) along the XY plane, the surface 3313 (left surface in FIG. 7) along the YZ plane, and the surface 3315 and a surface 3317 (upper and right surfaces in FIG. 7) parallel to the Y axis and tilted with respect to the XY and YZ planes.

The surface 3317 is disposed on the +Z axis direction side with respect to the light emitting element 32 and tilted to face the light emitting element 32 side. As a result, the light LL from the light emitting element 32 can be incident into the prism 331B via the surface 3317. The tilt angle (angle θ6) of the surface 3317 with respect to the XY plane (surface 3311) is, for example, approximately 150°.

Here, the light emitting element 32 is supported by a support member (not illustrated) to be tilted at an angle θ0 (such as approximately 30°) with respect to the XY plane (surface 30) along a plane parallel to the surface 3317. As a result, the light LL from the light emitting element 32 can be efficiently incident into the prism 331B even without the surface 3317 being provided with an antireflection film. It is a matter of course that the surface 3317 may be provided with an antireflection film.

In the optical element portion 33B configured as described above, the light LL from the light emitting element 32 is incident into the prism 331B via the surface 3317. The light LL incident into the prism 331B is split into the first beam LL1 and the second beam LL2 by the beam splitter 334. The first beam LL1 heads for the irradiation point P of the scale portion 22. The second beam LL2 heads for the irradiation point P of the scale portion 22 by being reflected by the mirror portion 333. During the course, the second beam LL2 passes through the phase difference plate 335, which results in a difference in phase from the first beam LL1.

Here, the angle θ1 is approximately 45° and the angle θ2 is approximately 30° in a case where, for example, the prism 331B is made of BK7, the angle θ6 is 150°, and the angle θ0 is 30°.

The same effect as in the first embodiment described above can be achieved with the third embodiment described above.

Fourth Embodiment

Figure 8:
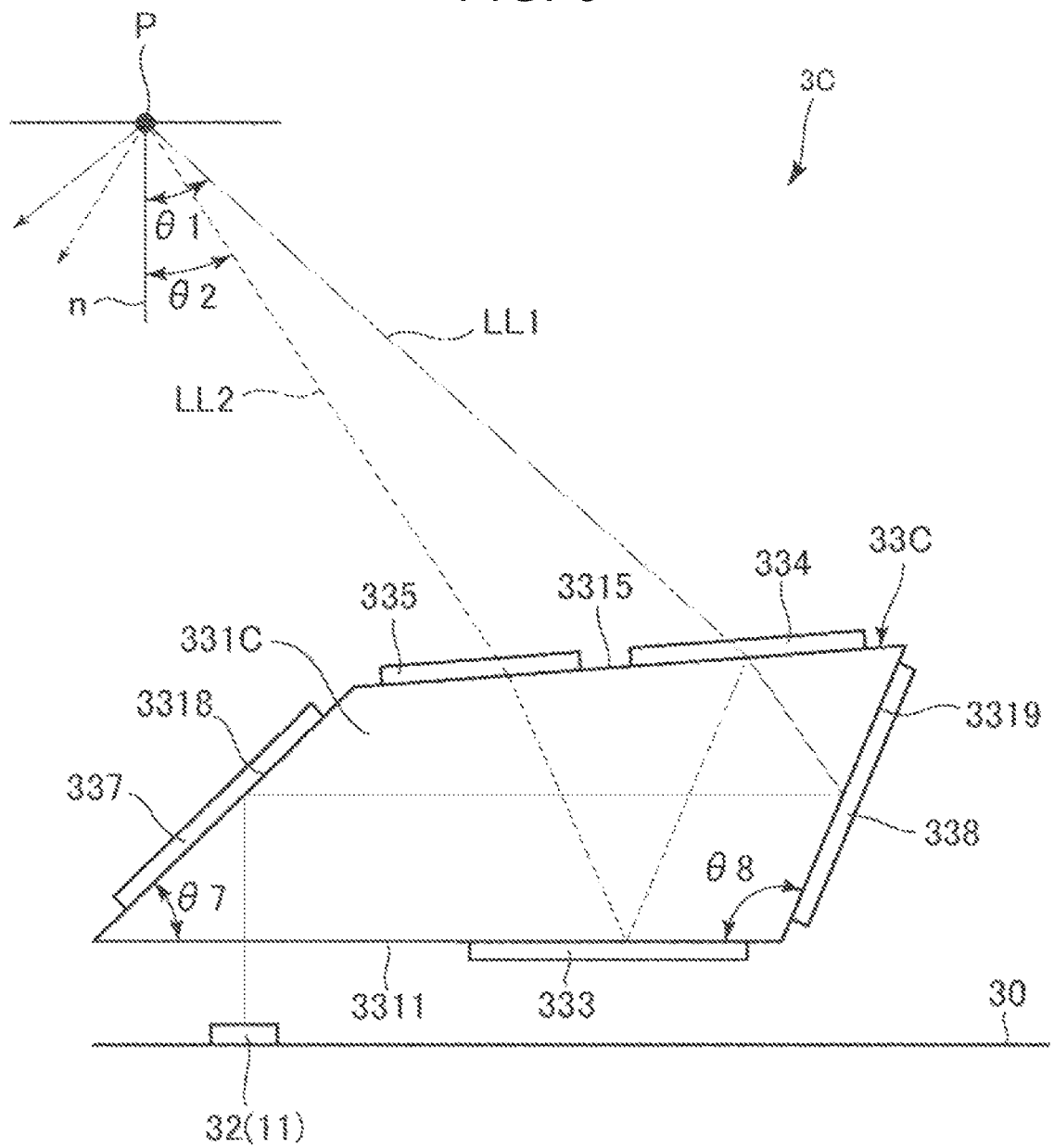
FIG. 8 is a schematic sectional view (diagram cut along the XZ plane) illustrating a sensor unit (light emitting portion and optical element portion) of an encoder according to a fourth embodiment of the invention.

FIG. 8 is a schematic sectional view (diagram cut along the XZ plane) illustrating a sensor unit (light emitting portion and optical element portion) of an encoder according to a fourth embodiment of the invention.

The following description of the fourth embodiment will focus on how the fourth embodiment differs from the above-described embodiments with description of similar matters omitted. In FIG. 8, the same reference numerals will be used to refer to the same configurations as in the above-described embodiments.

A sensor unit 3C illustrated in FIG. 8 is provided with an optical element portion 33C. The optical element portion 33C has a prism 331C along with the mirror portion 333, mirror portions 337 and 338, the beam splitter 334, and the phase difference plate 335 disposed on the prism 331C.

The prism 331C has the surface 3311 (lower surface in FIG. 8) along the XY plane and the surface 3315 and surfaces 3318 and 3319 (upper, left, and right surfaces in FIG. 8) parallel to the Y axis and tilted with respect to the XY and YZ planes.

In the present embodiment, the −X axis direction side end portion (part where the mirror portion 333 is not disposed) of the surface 3311 faces the light emitting element 32. As a result, the light LL from the light emitting element 32 can be incident into the prism 331C via the surface 3311.

The surface 3318 is disposed on the +Z axis direction side with respect to the light emitting element 32 and tilted to face the side (+Z axis direction side) that is opposite to the light emitting element 32. The tilt angle (angle θ7) of the surface 3318 with respect to the XY plane (surface 3311) is, for example, approximately 45°. The surface 3319 is disposed on the +X axis direction side with respect to the surfaces 3311 and 3315 and tilted to face the +Z axis direction side. The tilt angle (angle θ8) of the surface 3319 with respect to the XY plane (surface 3311) is, for example, approximately 120°.

The mirror portion 337 (second mirror portion) is disposed on the surface 3318 of the prism 331C described above and is along the surface 3318, and thus the mirror portion 337 is parallel to the Y axis and tilted with respect to the XY and YZ planes. The mirror portion 337 is made of, for example, a dielectric multilayer thin film (optical multilayer thin film) or a metal thin film for a reflectance of 100%. The mirror portion 337 reflects the light LL incident into the prism 331C via the surface 3311 toward the surface 3319.

The mirror portion 338 (second mirror portion) is disposed on the surface 3319 of the prism 331C described above and is along the surface 3319, and thus the mirror portion 338 is parallel to the Y axis and tilted with respect to the XY and YZ planes. The mirror portion 338 is made of, for example, a dielectric multilayer thin film (optical multilayer thin film) or a metal thin film for a reflectance of 100%. The mirror portion 338 reflects the light LL from the mirror portion 337 toward the beam splitter 334.

In the optical element portion 33C configured as described above, the light LL from the light emitting element 32 is incident into the prism 331C via the surface 3311. The light LL incident into the prism 331C is sequentially reflected by the mirror portions 337 and 338 and then split into the first beam LL1 and the second beam LL2 by the beam splitter 334. The first beam LL1 heads for the irradiation point P of the scale portion 22. The second beam LL2 heads for the irradiation point P of the scale portion 22 by being reflected by the mirror portion 333. During the course, the second beam LL2 passes through the phase difference plate 335, which results in a difference in phase from the first beam LL1.

Here, the angle θ1 is approximately 45° and the angle θ2 is approximately 30° in a case where, for example, the prism 331C is made of BK7, the angle θ7 is 45°, and the angle θ8 is 120°.

The same effect as in the first embodiment described above can be achieved with the fourth embodiment described above.

Fifth Embodiment

Figure 9:
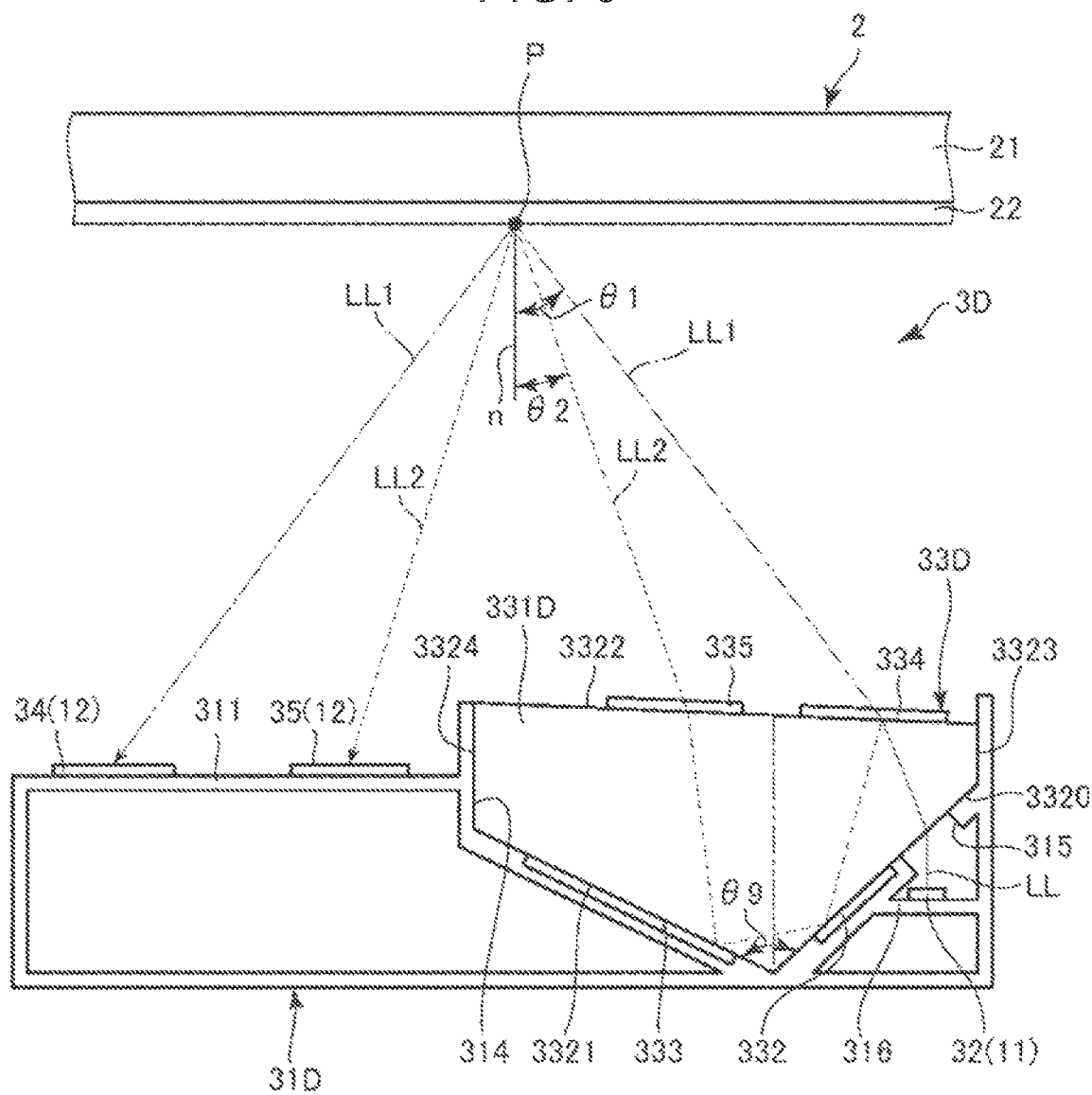
FIG. 9 is a schematic sectional view (diagram cut along the XZ plane) illustrating a sensor unit (light emitting portion, light receiving portion, and optical element portion) of an encoder according to a fifth embodiment of the invention.

FIG. 9 is a schematic sectional view (diagram cut along the XZ plane) illustrating a sensor unit (light emitting portion, light receiving portion, and optical element portion) of an encoder according to a fifth embodiment of the invention. FIG. 10 is a plan view (diagram viewed from the Z axis direction) of a holder of the sensor unit illustrated in FIG. 9.

The following description of the fifth embodiment will focus on how the fifth embodiment differs from the above-described embodiments with description of similar matters omitted. In FIGS. 9 and 10, the same reference numerals will be used to refer to the same configurations as in the above-described embodiments.

A sensor unit 3D illustrated in FIG. 9 has the light emitting element 32, the light receiving elements 34 and 35, an optical element portion 33D, and a holder 31D holding the light emitting element 32, the light receiving elements 34 and 35, and the optical element portion 33D.

The holder 31D has the light receiving element installation portion 311 where the light receiving elements 34 and 35 are installed, an optical element installation portion 314 where the optical element portion 33D is installed, and a light emitting element installation portion 316 where the light emitting element 32 is installed.

The optical element installation portion 314 is a recessed portion that has a part recessed to the −Z axis direction side beyond the light receiving element installation portion 311 to have a shape matching the outer shape of the optical element portion 33D. The optical element portion 33D is disposed in the optical element installation portion 314 and fixed with respect to the holder 31D. The light emitting element installation portion 316 is disposed at a position communicating with the optical element installation portion 314 via an opening portion 315 open to a wall surface of the optical element installation portion 314 and has a plate shape along the XY plane. The light emitting element 32 is fixed by an adhesive or the like to the optical scale 2 side surface of the light emitting element installation portion 316.

The optical element portion 33D has a prism 331D along with the mirror portions 332 and 333, the beam splitter 334, and the phase difference plate 335 disposed on the prism 331D.

As illustrated in FIG. 9, the prism 331D has three surfaces 3320, 3321, and 3322 (two lower and one upper surfaces in FIG. 9) parallel to the Y axis and tilted with respect to the XY and YZ planes and two surfaces 3323 and 3324 (right and left surfaces in FIG. 9) along the YZ plane.

When viewed from the Z axis direction, the surface 3320 is disposed at a position overlapping the light emitting element 32 at the +X axis direction side part of the prism 331D and tilted to face the light emitting element 32 side (−Z axis direction side). As a result, the light LL from the light emitting element 32 can be incident into the prism 331D via the surface 3320. The mirror portion 332 is disposed, on the −Z axis direction side with respect to the part where the light LL is incident, on the surface 3320.

The surface 3321 is disposed at the −X axis direction side part of the prism 331D and tilted to face the −Z axis direction side. Here, an angle θ9 formed by the surface 3320 and the surface 3321 is, for example, approximately 105°. The mirror portion 333 is disposed on the surface 3321.

Each of the two surfaces 3323 and 3324 abuts against a wall surface of the optical element installation portion 314 of the holder 31D described above. As a result, the position of the prism 331D in the X axis direction and the posture of the prism 331D in the XY plane can be regulated. In addition, by the two surfaces 3323 and 3324 being provided, the prism 331D can be smaller in size than a prism 331E according to a sixth embodiment (described later).

The surface 3322 is disposed on the +Z axis direction side with respect to the surfaces 3320 and 3321 and tilted with respect to the XY and YZ planes to be away from the optical scale 2 toward the +X axis direction side. The tilt angle of the surface 3322 with respect to the XY plane (hereinafter, referred to as the "tilt angle of the surface 3322") is, for example, approximately 5°. On the surface 3322, the beam splitter 334 is disposed on the +X axis direction side and the phase difference plate 335 is disposed on the −X axis direction side.

In the optical element portion 33D configured as described above, the light LL from the light emitting element 32 is incident into the prism 331D via the surface 3320. The light LL incident into the prism 331D is split into the first beam LL1 and the second beam LL2 by the beam splitter 334. The first beam LL1 heads for the irradiation point P of the scale portion 22. The second beam LL2 heads for the irradiation point P of the scale portion 22 by being sequentially reflected by the mirror portions 332 and 333. During the course, the second beam LL2 passes through the phase difference plate 335, which results in a difference in phase from the first beam LL1.

Here, the angle θ1 is approximately 30° and the angle θ2 is approximately 15° in a case where, for example, the prism 331D is made of BK7 (glass material), the angle θ9 is 105°, and the tilt angle of the surface 3322 is 5°.

The same effect as in the first embodiment described above can be achieved with the fifth embodiment described above.

Sixth Embodiment

Figure 11:
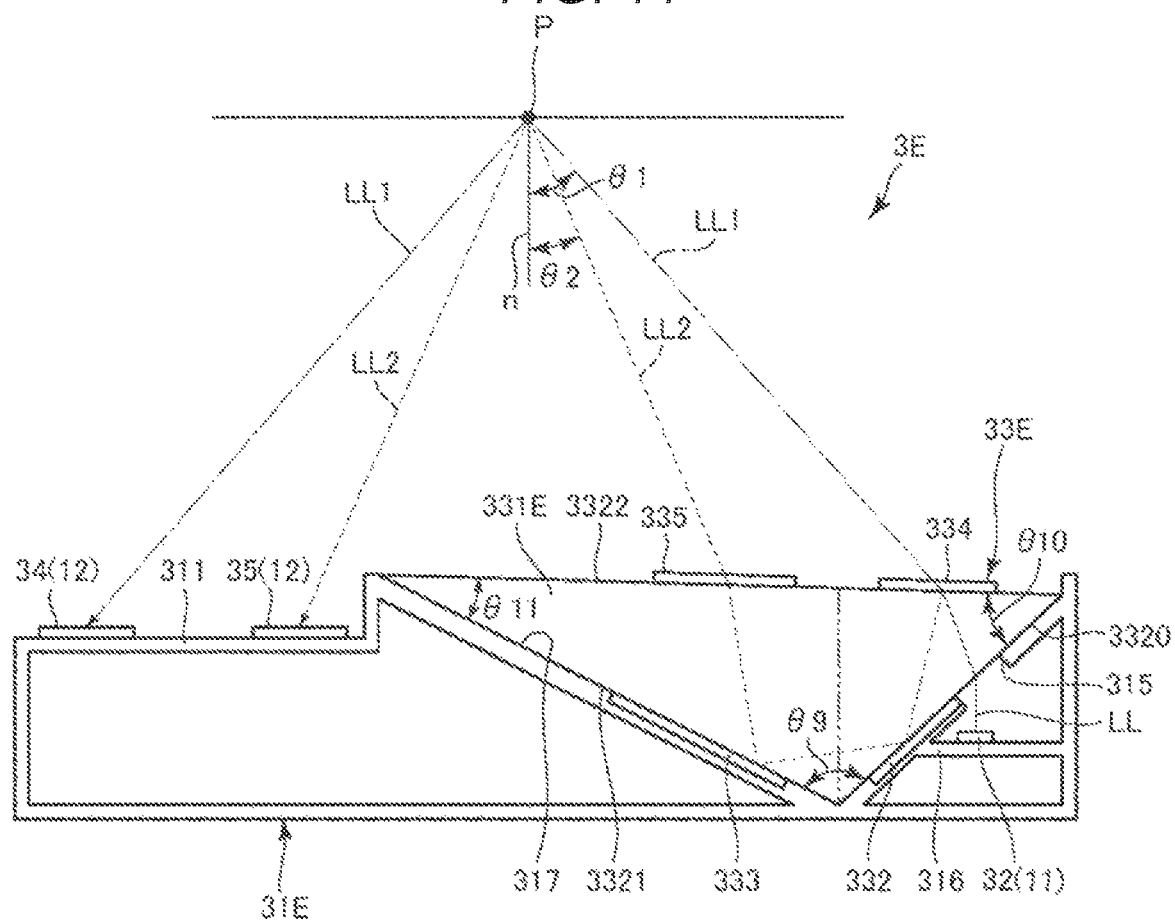
FIG. 11 is a schematic sectional view (diagram cut along the XZ plane) illustrating a sensor unit (light emitting portion, light receiving portion, and optical element portion) of an encoder according to a sixth embodiment of the invention.

FIG. 11 is a schematic sectional view (diagram cut along the XZ plane) illustrating a sensor unit (light emitting portion, light receiving portion, and optical element portion) of an encoder according to the sixth embodiment of the invention.

The following description of the sixth embodiment will focus on how the sixth embodiment differs from the above-described embodiments with description of similar matters omitted. In FIG. 11, the same reference numerals will be used to refer to the same configurations as in the above-described embodiments.

A sensor unit 3E illustrated in FIG. 11 has the light emitting element 32, the light receiving elements 34 and 35, an optical element portion 33E, and a holder 31E holding the light emitting element 32, the light receiving elements 34 and 35, and the optical element portion 33E.

The holder 31E has the light receiving element installation portion 311 where the light receiving elements 34 and 35 are installed, an optical element installation portion 317 where the optical element portion 33E is installed, and the light emitting element installation portion 316 where the light emitting element 32 is installed.

The optical element installation portion 317 is a recessed portion that has a part recessed to the −Z axis direction side beyond the light receiving element installation portion 311 to have a shape matching the outer shape of the optical element portion 33E. The optical element portion 33E is disposed in the optical element installation portion 317 and fixed with respect to the holder 31E. The light emitting element installation portion 316 is disposed at a position communicating with the optical element installation portion 317 via the opening portion 315 open to a wall surface of the optical element installation portion 317.

The optical element portion 33E has the prism 331E along with the mirror portions 332 and 333, the beam splitter 334, and the phase difference plate 335 disposed on the prism 331E.

As illustrated in FIG. 11, the prism 331E has the three surfaces 3320, 3321, and 3322 (two lower and one upper surfaces in FIG. 11) parallel to the Y axis and tilted with respect to the XY and YZ planes. The prism 331E according to the present embodiment has a shape in which the two surfaces 3323 and 3324 of the prism 331D according to the fifth embodiment described above are omitted. Accordingly, the prism 331E according to the present embodiment is advantageous in that the prism 331E can be formed in a simple manner by bonding of two prisms. Here, an angle θ10 formed by the surface 3322 and the surface 3320 is, for example, approximately 45°. An angle θ11 formed by the surface 3322 and the surface 3321 is, for example, approximately 30°.

In the present embodiment, the two surfaces 3320 and 3321 abut against a wall surface of the optical element installation portion 317 (recessed portion) of the holder 31E described above. As a result, the position of the prism 331E in the X axis direction and the posture of the prism 331E in the XY plane can be regulated.

As is the case with the optical element portion 33D described above, in the optical element portion 33E configured as described above, the light LL from the light emitting element 32 is split into the first beam LL1 and the second beam LL2 and the irradiation point P of the scale portion 22 is irradiated with the first beam LL1 and the second beam LL2.

The same effect as in the first embodiment described above can be achieved with the sixth embodiment described above.

Seventh Embodiment

Figure 12:
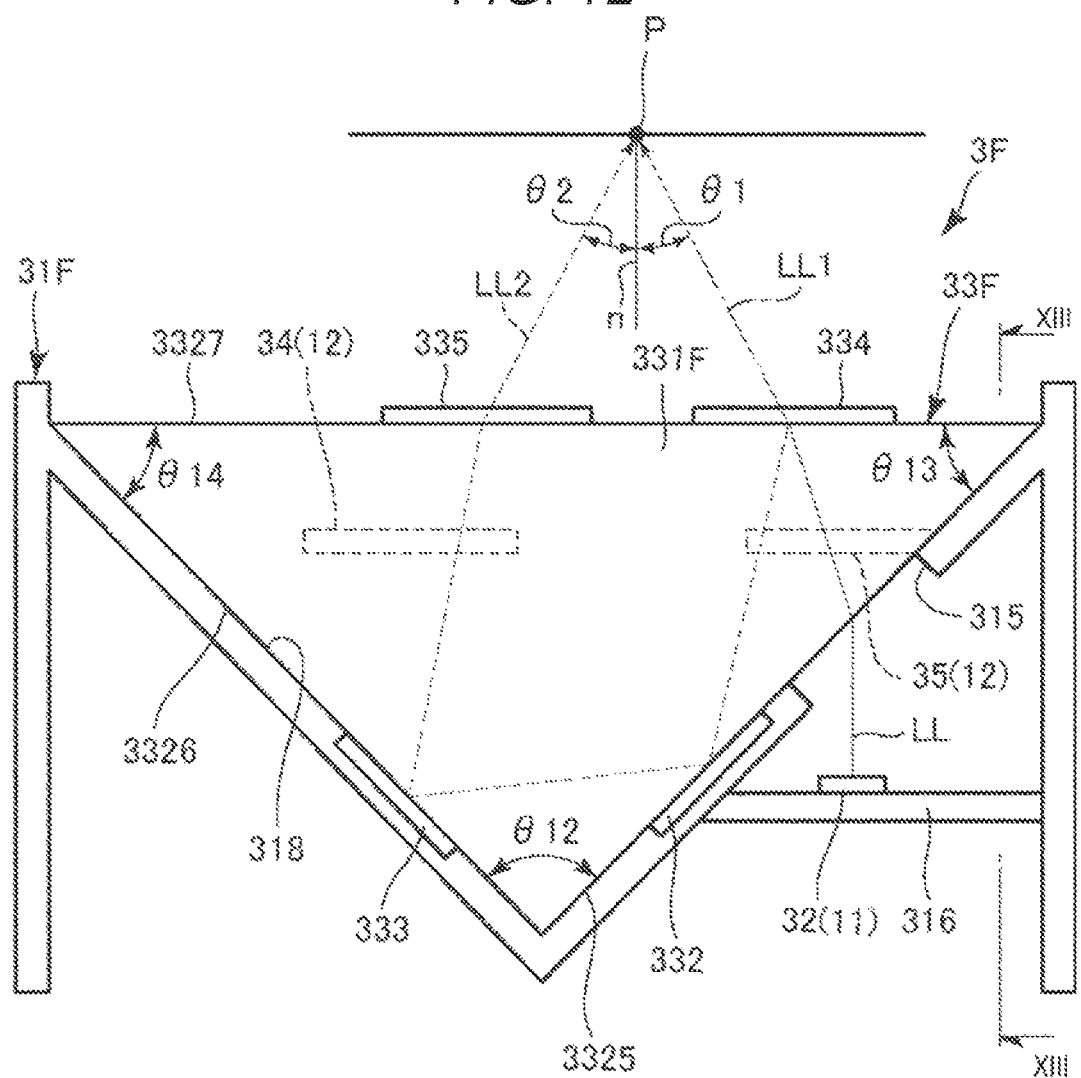
FIG. 12 is a schematic sectional view (diagram cut along the XZ plane) illustrating a sensor unit (light emitting portion, light receiving portion, and optical element portion) of an encoder according to a seventh embodiment of the invention.
Figure 13:
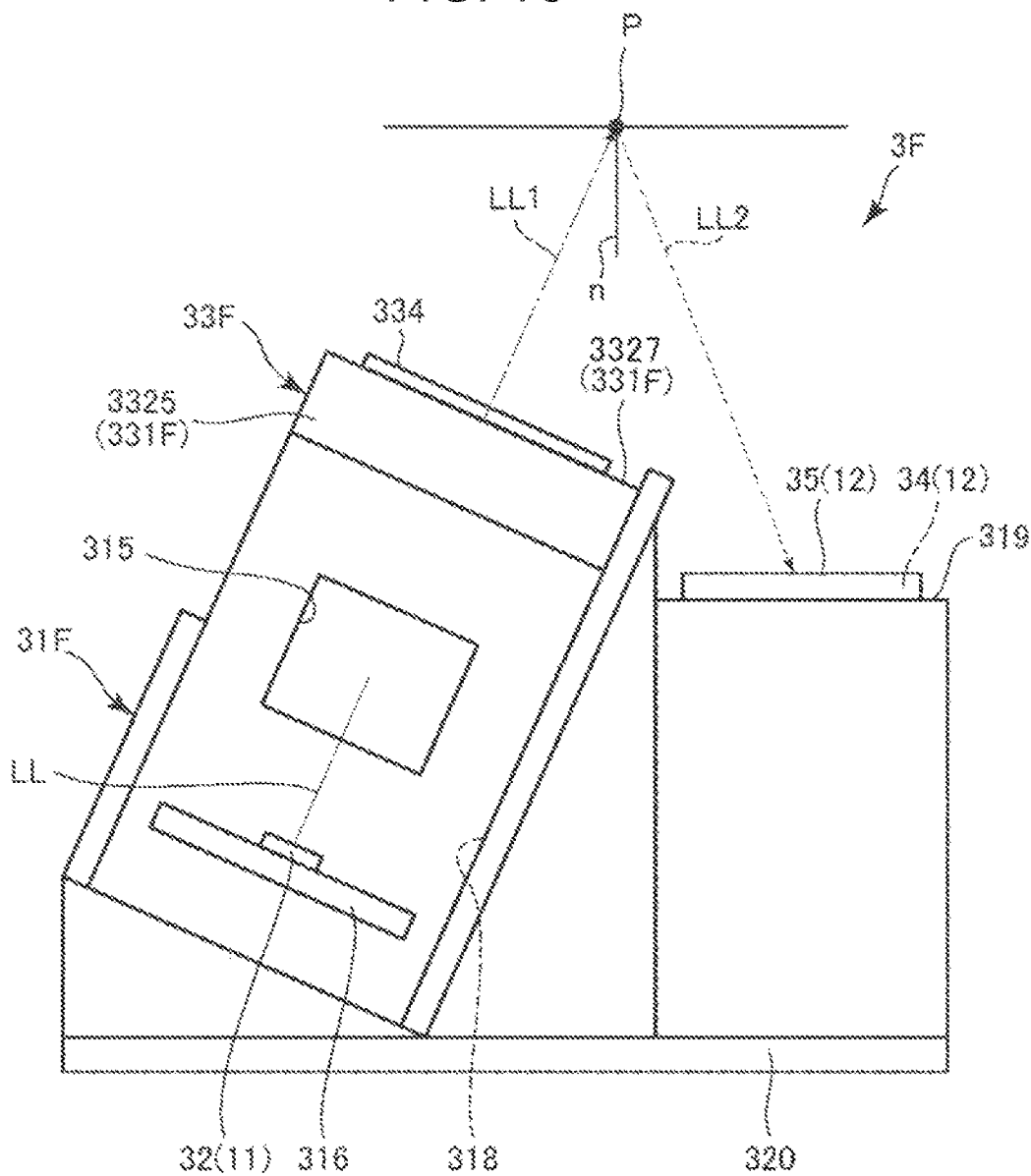
FIG. 13 is a side view (cross-sectional view taken along line XIII-XIII of FIG. 12 of the sensor unit illustrated in FIG. 12.
Figure 14:
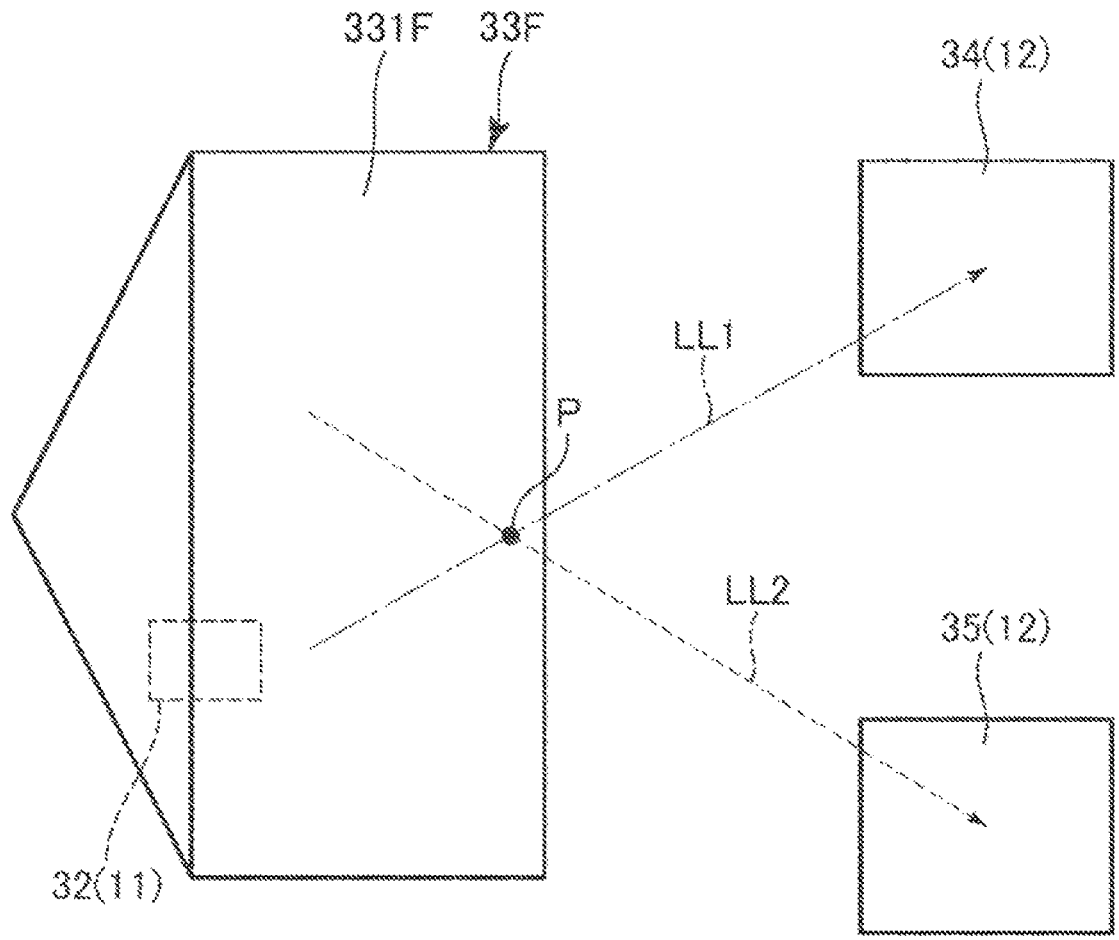
FIG. 14 is a plan view (diagram viewed from the Z axis direction) illustrating the optical paths of the first and second beams in the sensor unit illustrated in FIG. 12.

FIG. 12 is a schematic sectional view (diagram cut along the XZ plane) illustrating a sensor unit (light emitting portion, light receiving portion, and optical element portion) of an encoder according to a seventh embodiment of the invention. FIG. 13 is a side view (cross-sectional view taken along line XIII-XIII of FIG. 12) of the sensor unit illustrated in FIG. 12. FIG. 14 is a plan view (diagram viewed from the Z axis direction) illustrating the optical paths of the first and second beams in the sensor unit illustrated in FIG. 12.

The following description of the seventh embodiment will focus on how the seventh embodiment differs from the above-described embodiments with description of similar matters omitted. In FIGS. 12 to 14, the same reference numerals will be used to refer to the same configurations as in the above-described embodiments.

A sensor unit 3F illustrated in FIG. 12 has the light emitting element 32, the light receiving elements 34 and 35, an optical element portion 33F, and a holder 31F holding the light emitting element 32, the light receiving elements 34 and 35, and the optical element portion 33F.

As illustrated in FIG. 13, the holder 31F has a light receiving element installation portion 319 where the light receiving elements 34 and 35 are installed, an optical element installation portion 318 where the optical element portion 33F is installed, and the light emitting element installation portion 316 where the light emitting element 32 is installed. Here, the holder 31F is installed on a support member 320.

The light receiving element installation portion 319 has a plate shape along the XY plane. The light receiving elements 34 and 35 are fixed by an adhesive or the like to the optical scale 2 side surface of the light receiving element installation portion 319. The optical element installation portion 318 is a recessed portion that has a part recessed to the −Z axis direction side beyond the light receiving element installation portion 319 to have a shape matching the outer shape of the optical element portion 33F. The optical element portion 33F is disposed in the optical element installation portion 318 and fixed with respect to the holder 31F. The light emitting element installation portion 316 is disposed at a position communicating with the optical element installation portion 318 via the opening portion 315 open to a wall surface of the optical element installation portion 318 and has a plate shape along the XY plane.

As illustrated in FIG. 13, the optical element installation portion 318 has a side surface along a direction tilted around the X axis with respect to the XZ plane. As a result, the optical element portion 33F can be installed in a state where the optical element portion 33F is tilted around the X axis with respect to the XZ plane. In addition, the light emitting element installation portion 316 is disposed such that the light emitting portion 11 is installed in a tilted state in accordance with the tilting of the optical element portion 33F.

As illustrated in FIG. 12, the optical element portion 33F has a prism 331F along with the mirror portions 332 and 333, the beam splitter 334, and the phase difference plate 335 disposed on the prism 331F.

The prism 331F has two surfaces 3325 and 3326 (lower surfaces in FIG. 12) parallel to the Y axis and tilted with respect to the XY and YZ planes and a surface 3327 (upper surface in FIG. 12) along the XY plane.

When viewed from the Z axis direction, the surface 3325 is disposed at a position overlapping the light emitting element 32 and tilted to face the light emitting element 32 side (−Z axis direction side). As a result, the light LL from the light emitting element 32 can be incident into the prism 331F via the surface 3325. The mirror portion 332 is disposed, on the −Z axis direction side with respect to the part where the light LL is incident, on the surface 3325.

The surface 3326 is disposed on the −X axis direction side with respect to the surface 3325 described above and tilted to face the −Z axis direction side. Here, an angle θ12 formed by the surface 3325 and the surface 3326 is, for example, approximately 90°. The mirror portion 333 is disposed on the surface 3326.

Each of the two surfaces 3325 and 3326 abuts against a wall surface of the optical element installation portion 318 (recessed portion) of the holder 31F described above. As a result, the position and posture of the prism 331F can be regulated.

The surface 3327 is disposed on the +Z axis direction side with respect to the surfaces 3325 and 3326. Here, an angle θ13 formed by the surface 3325 and the surface 3327 is, for example, approximately 45°. In addition, an angle θ14 formed by the surface 3326 and the surface 3327 is equal to the angle θ13 and, for example, approximately 45°. An advantage is obtained as an existing prism can be used as it is by each of the angle θ13 and the angle θ14 being 45° as described above. On the surface 3327, the beam splitter 334 is disposed on the +X axis direction side and the phase difference plate 335 is disposed on the −X axis direction side.

In the optical element portion 33F configured as described above, the light LL from the light emitting element 32 is incident into the prism 331F via the surface 3325. The light LL incident into the prism 331F is split into the first beam LL1 and the second beam LL2 by the beam splitter 334. The first beam LL1 heads for the irradiation point P of the scale portion 22. The second beam LL2 heads for the irradiation point P of the scale portion 22 by being sequentially reflected by the mirror portions 332 and 333. During the course, the second beam LL2 passes through the phase difference plate 335, which results in a difference in phase from the first beam LL1.

Here, each of the angle θ1 and the angle θ2 is approximately 30° in a case where, for example, the prism 331F is made of BK7 (glass material) and each of the angle θ13 and the angle θ14 is 45°. In addition, when viewed from the X axis direction, the first beam LL1 and the second beam LL2 are emitted from the optical element portion 33F in directions having Y and Z axis direction components as illustrated in FIG. 13, respectively. In addition, when viewed from the Z axis direction, the first beam LL1 and the second beam LL2 are emitted from the optical element portion 33F in directions having X and Y axis direction components as illustrated in FIG. 14, respectively. By the first beam LL1 and the second beam LL2 being emitted from the optical element portion 33F in the direction having the Y axis direction component as described above, the light receiving portion 12 and the optical element portion 33F can be arranged in the Y axis direction and the sensor unit 3F can be reduced in size in the X axis direction.

The same effect as in the first embodiment described above can be achieved with the seventh embodiment described above.

Eighth Embodiment

Figure 15:
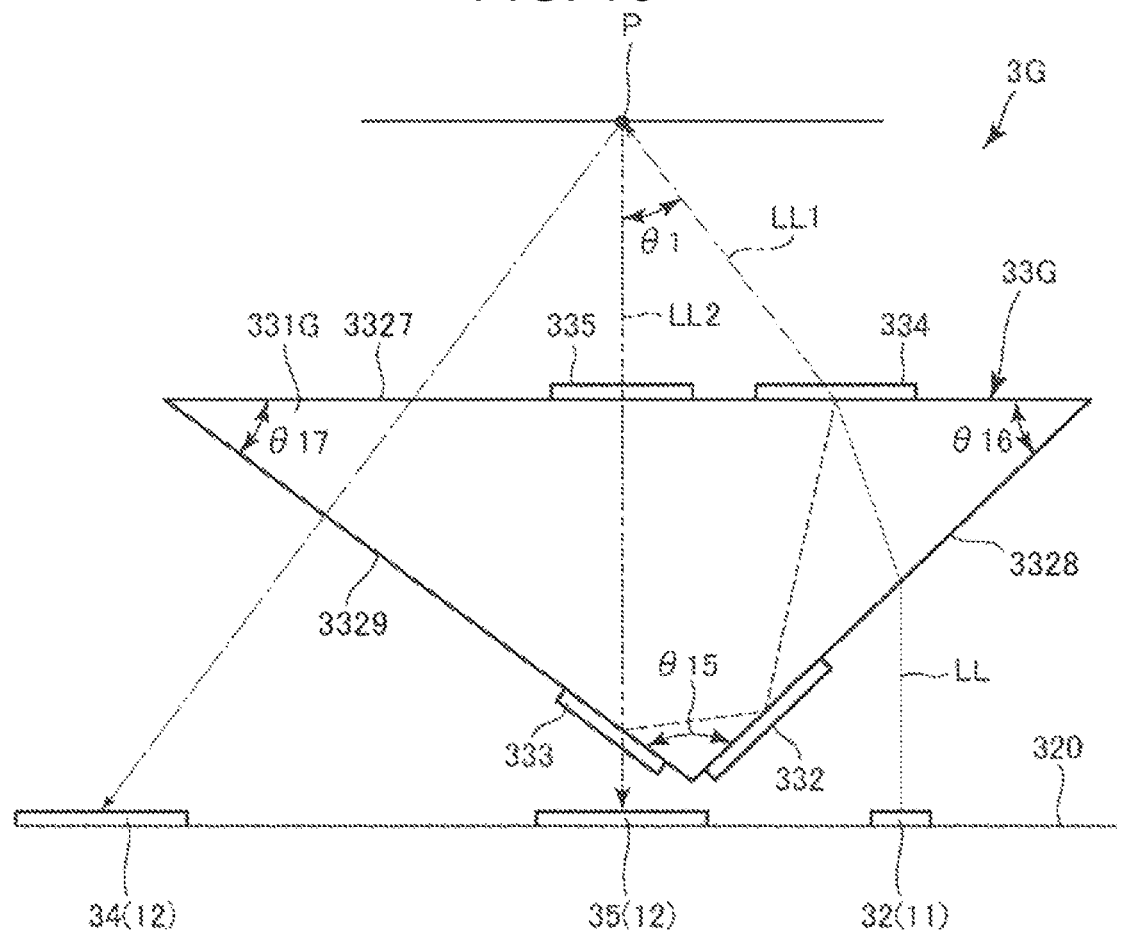
FIG. 15 is a schematic sectional view (diagram cut along the XZ plane) illustrating a sensor unit (light emitting portion, light receiving portion, and optical element portion) of an encoder according to an eighth embodiment of the invention.
Figure 16:
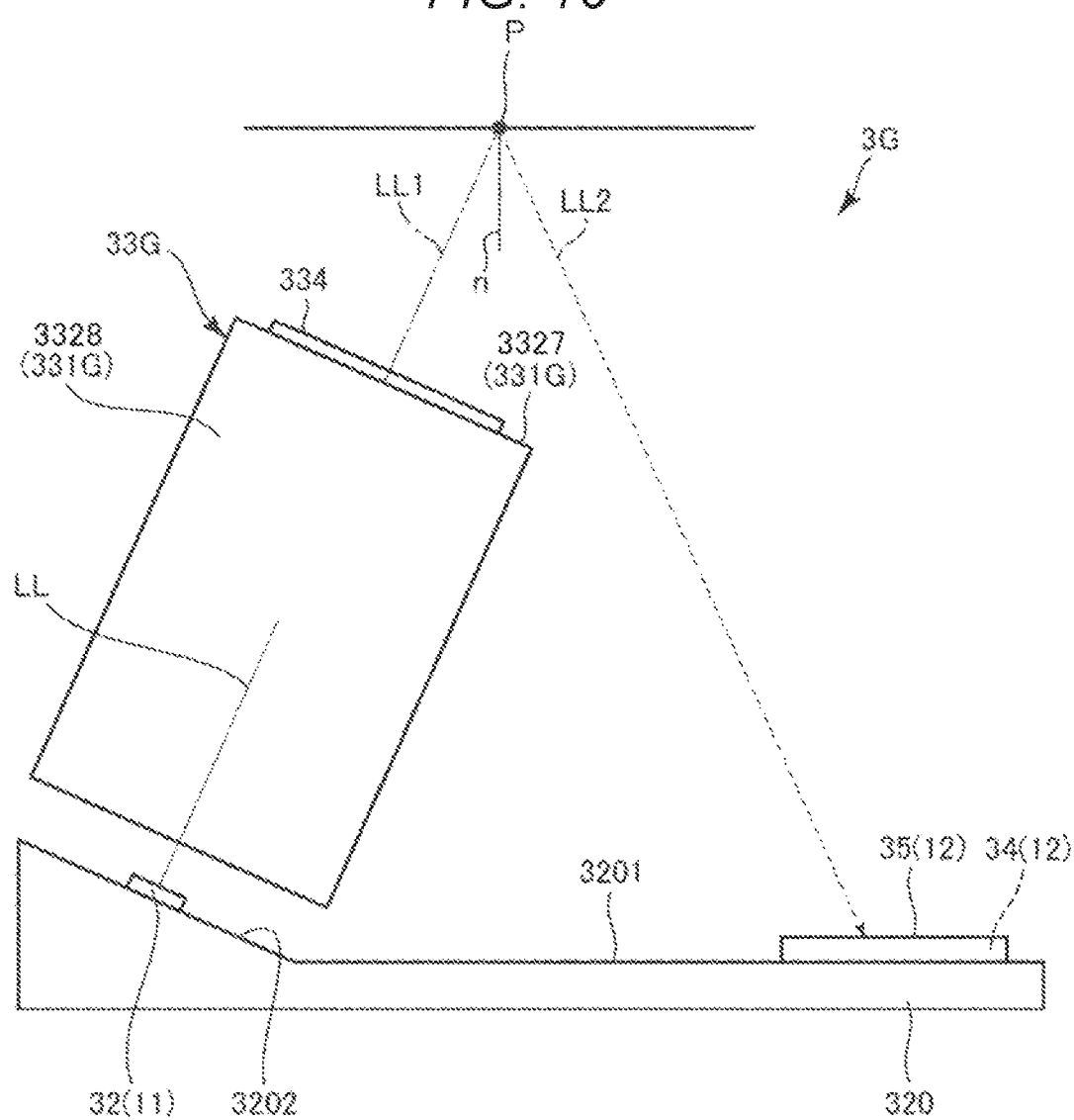
FIG. 16 is a side view (diagram viewed from the X axis direction) of the sensor unit illustrated in FIG. 15.
Figure 17:
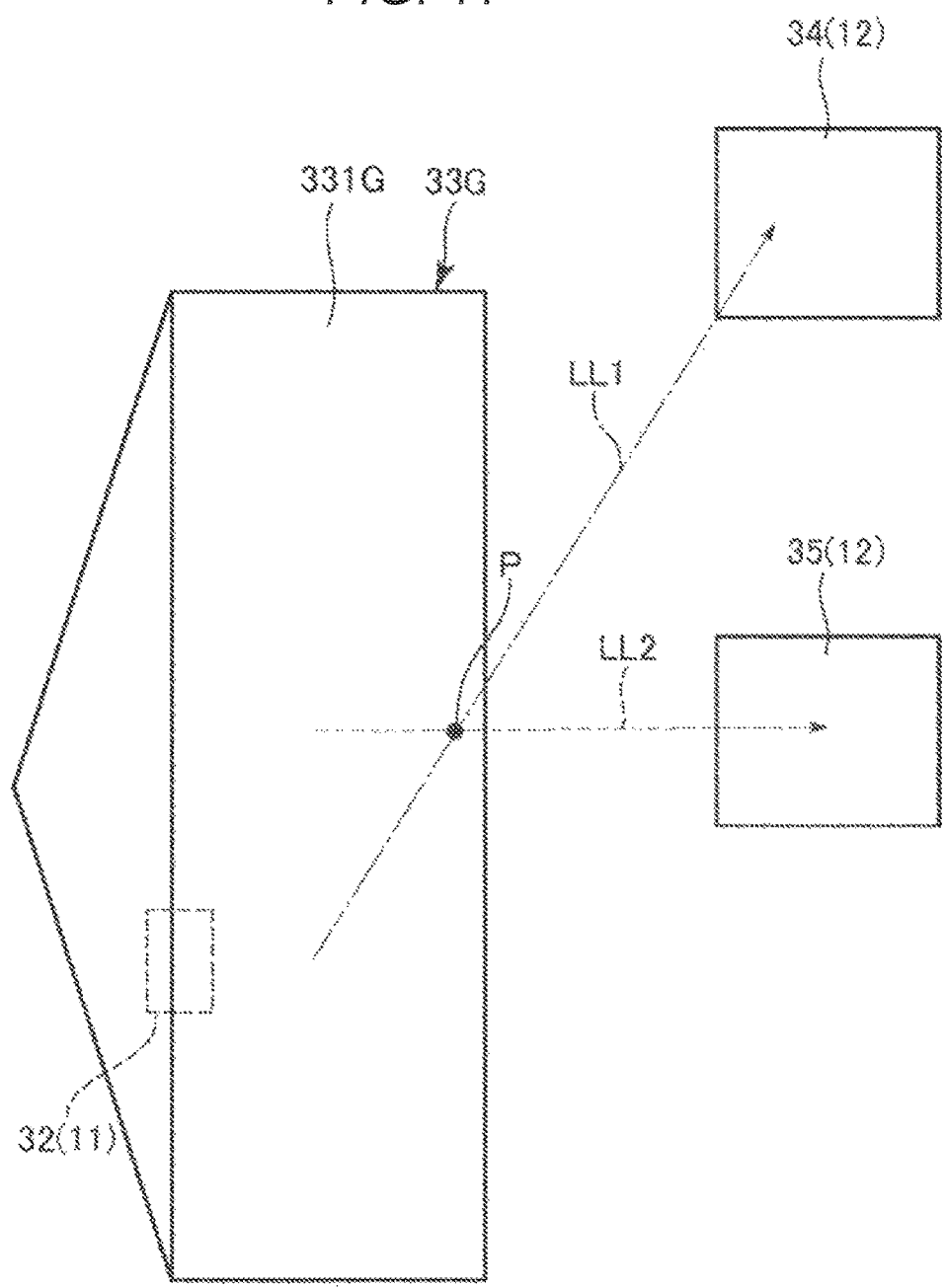
FIG. 17 is a plan view (diagram viewed from the Z axis direction) illustrating the optical paths of the first and second beams in the sensor unit illustrated in FIG. 15.

FIG. 15 is a schematic sectional view (diagram cut along the XZ plane) illustrating a sensor unit (light emitting portion, light receiving portion, and optical element portion) of an encoder according to an eighth embodiment of the invention. FIG. 16 is a side view (diagram viewed from the X axis direction) of the sensor unit illustrated in FIG. 15. FIG. 17 is a plan view (diagram viewed from the Z axis direction) illustrating the optical paths of the first and second beams in the sensor unit illustrated in FIG. 15.

The following description of the eighth embodiment will focus on how the eighth embodiment differs from the above-described embodiments with description of similar matters omitted. In FIGS. 15 to 17, the same reference numerals will be used to refer to the same configurations as in the above-described embodiments.

A sensor unit 3G illustrated in FIG. 15 is provided with an optical element portion 33G. The optical element portion 33G has a prism 331G along with the mirror portions 332 and 333, the beam splitter 334, and the phase difference plate 335 disposed on the prism 331G. Here, each of the light emitting portion 11 and the light receiving portion 12 is disposed on the support member 320, a surface 3201 where the light receiving portion 12 is disposed is along the XY plane, and a surface 3202 where the light emitting portion 11 is disposed is tilted with respect to the XY plane.

The prism 331G has two surfaces 3328 and 3329 (lower surfaces in FIG. 15) parallel to the Y axis and tilted with respect to the XY and YZ planes and the surface 3327 (upper surface in FIG. 15) along the XY plane.

When viewed from the Z axis direction, the surface 3328 is disposed at a position overlapping the light emitting element 32 and tilted to face the light emitting element 32 side (−Z axis direction side). As a result, the light LL from the light emitting element 32 can be incident into the prism 331G via the surface 3328. The mirror portion 332 is disposed, on the −Z axis direction side with respect to the part where the light LL is incident, on the surface 3328.

The surface 3329 is disposed on the −X axis direction side with respect to the surface 3328 described above and tilted to face the −Z axis direction side. Here, an angle θ15 formed by the surface 3328 and the surface 3329 is, for example, approximately 99°. The mirror portion 333 is disposed on the surface 3329.

The surface 3327 is disposed on the +Z axis direction side with respect to the surfaces 3328 and 3329. Here, an angle θ16 formed by the surface 3327 and the surface 3328 is, for example, approximately 45°. In addition, an angle θ17 formed by the surface 3327 and the surface 3329 is, for example, approximately 36° unlike the angle θ16. On the surface 3327, the beam splitter 334 is disposed on the +X axis direction side and the phase difference plate 335 is disposed on the −X axis direction side.

In the optical element portion 33G configured as described above, the light LL from the light emitting element 32 is incident into the prism 331G via the surface 3328. The light LL incident into the prism 331G is split into the first beam LL1 and the second beam LL2 by the beam splitter 334. The first beam LL1 heads for the irradiation point P of the scale portion 22. The second beam LL2 heads for the irradiation point P of the scale portion 22 by being sequentially reflected by the mirror portions 332 and 333. During the course, the second beam LL2 passes through the phase difference plate 335, which results in a difference in phase from the first beam LL1.

Here, the angle θ1 is approximately 26° and the angle θ2 is approximately 0° in a case where, for example, the prism 331G is made of BK7, the angle θ16 is 45°, and the angle θ17 is 36°. In addition, when viewed from the X axis direction, the first beam LL1 and the second beam LL2 are emitted from the optical element portion 33G in directions having Y and Z axis direction components as illustrated in FIG. 16, respectively. In addition, when viewed from the Z axis direction, the first beam LL1 is emitted from the optical element portion 33G in a direction having X and Y axis direction components and the second beam LL2 is emitted from the optical element portion 33G in the Y axis direction as illustrated in FIG. 17.

The same effect as in the first embodiment described above can be achieved with the eighth embodiment described above.

Ninth Embodiment

Figure 18:
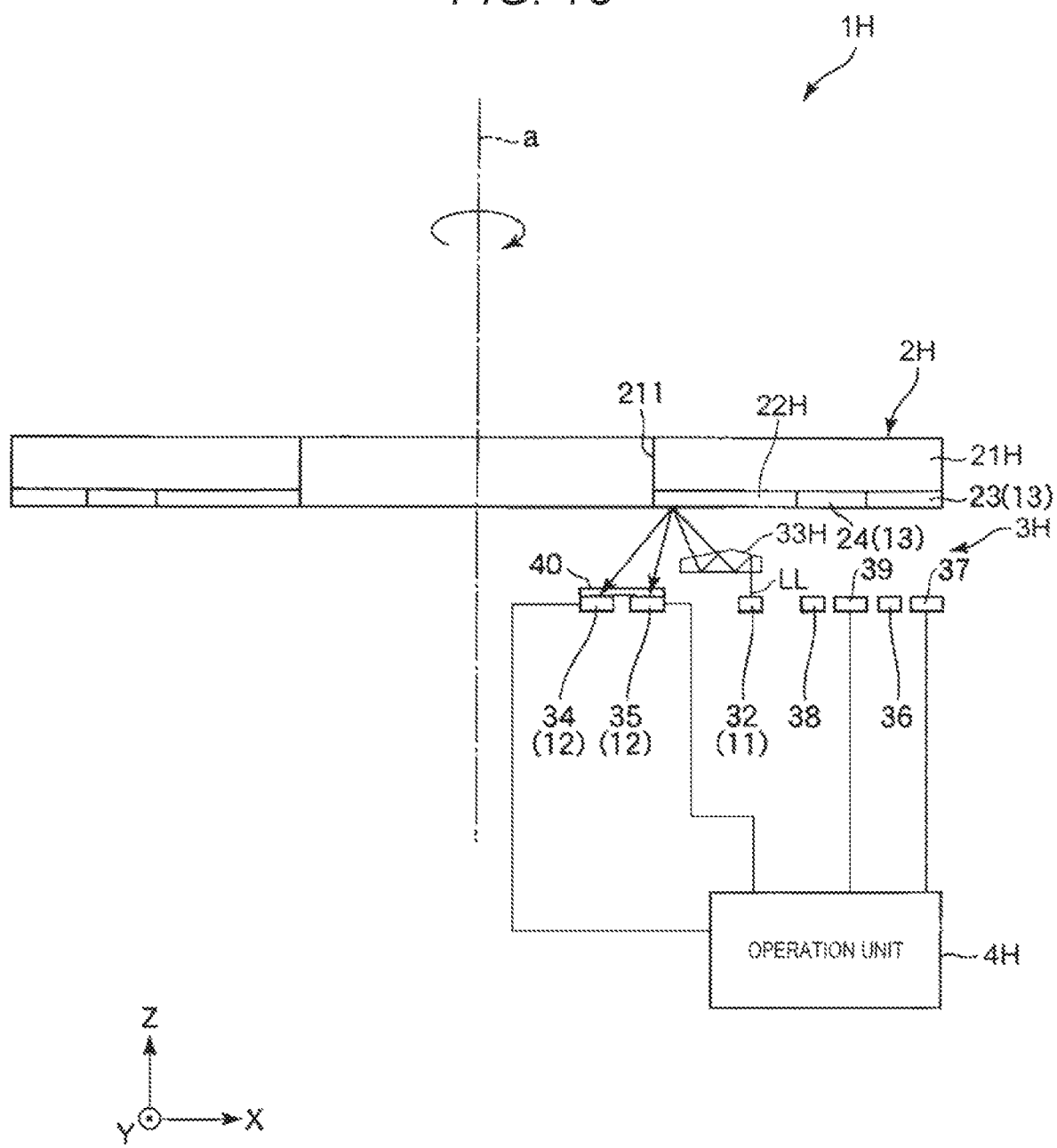
FIG. 18 is a sectional view (diagram cut along the XZ plane) schematically illustrating an encoder according to a ninth embodiment of the invention.
Figure 19:
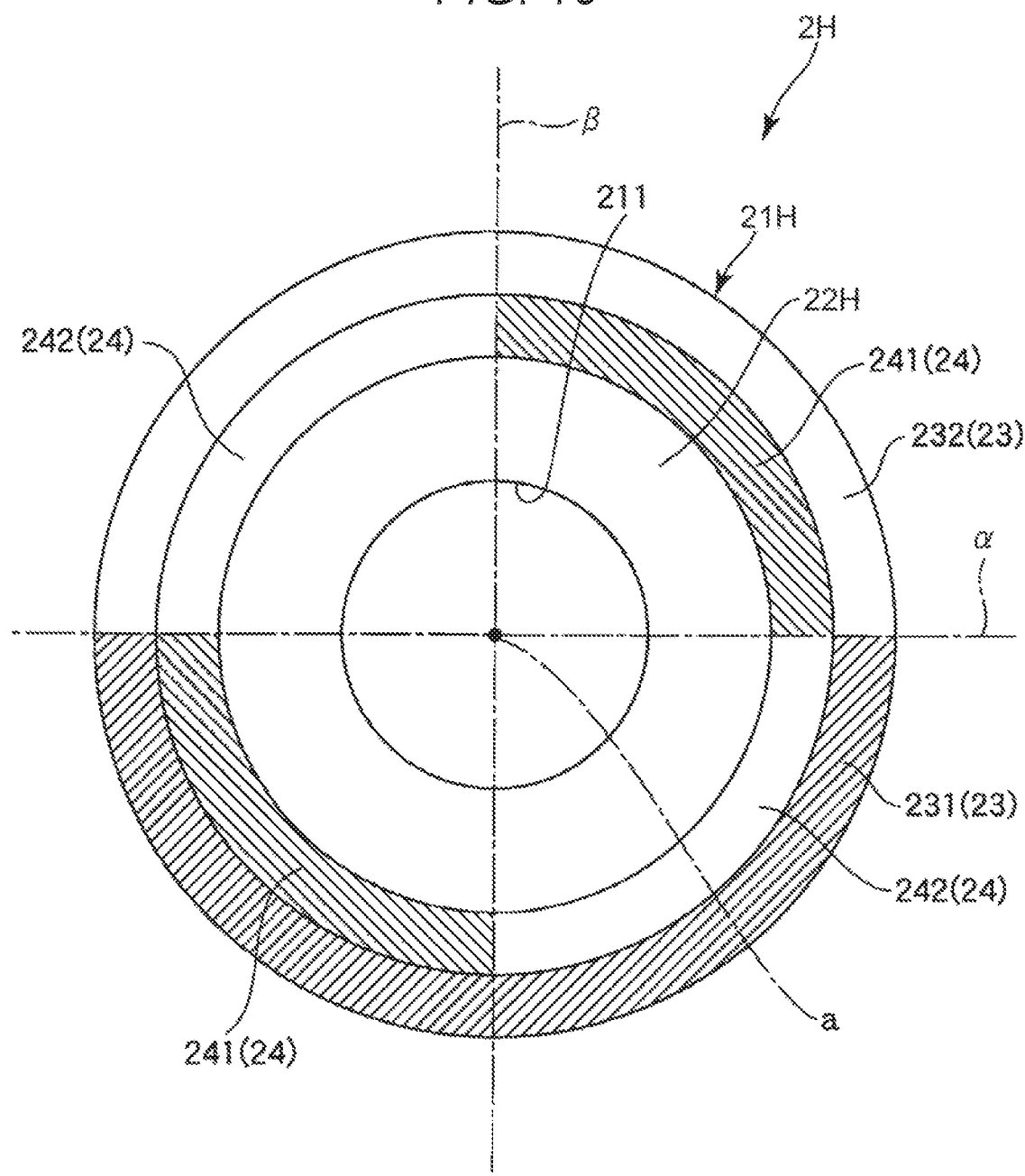
FIG. 19 is a plan view (diagram viewed from the Z axis direction) of an optical scale of the encoder illustrated in FIG. 18.
Figure 20:
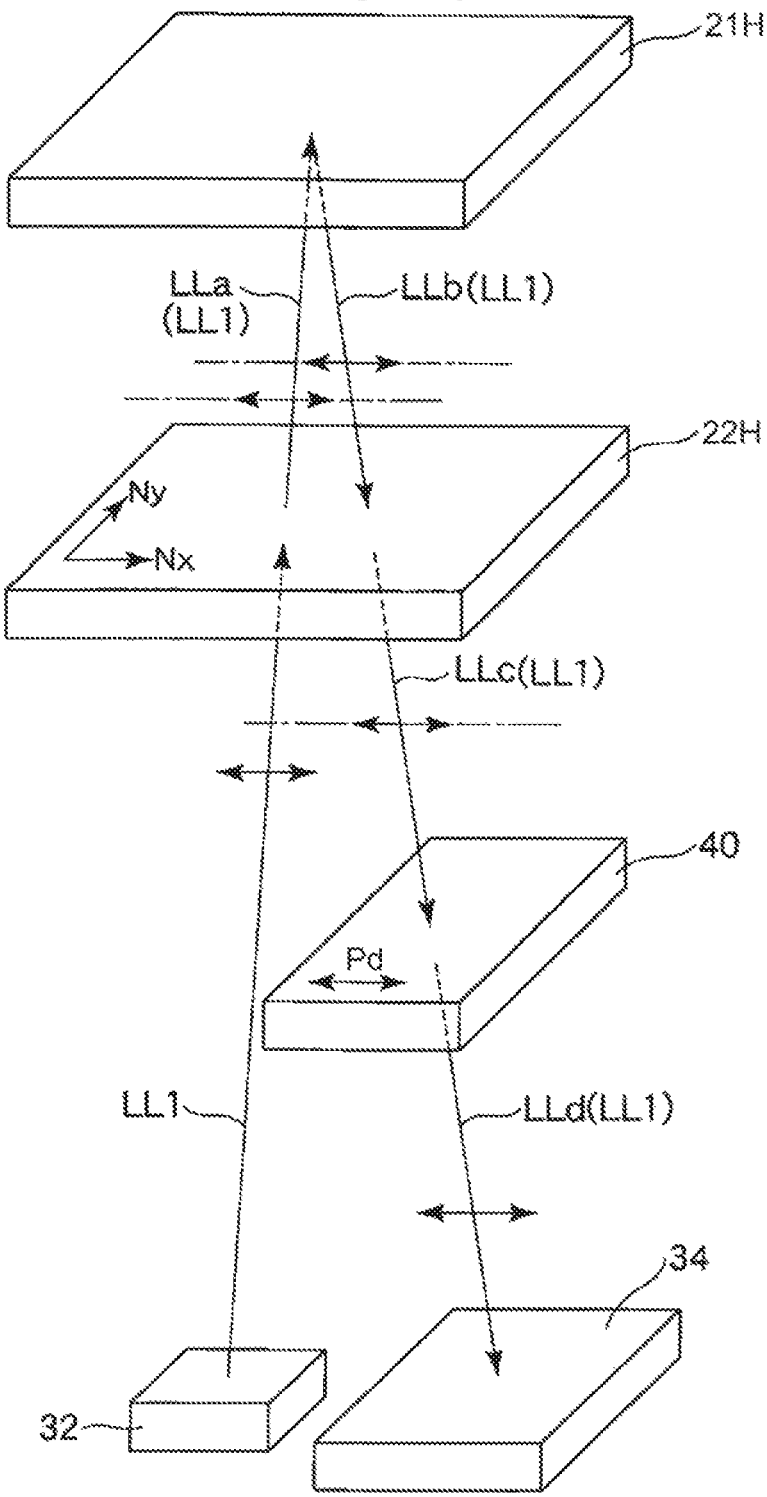
FIG. 20 is a conceptual diagram for showing the polarization state of the light that is received by a light receiving portion when the slow axis of a phase difference plate is parallel to the direction of linearly polarized light from a light emitting portion.
Figure 21:
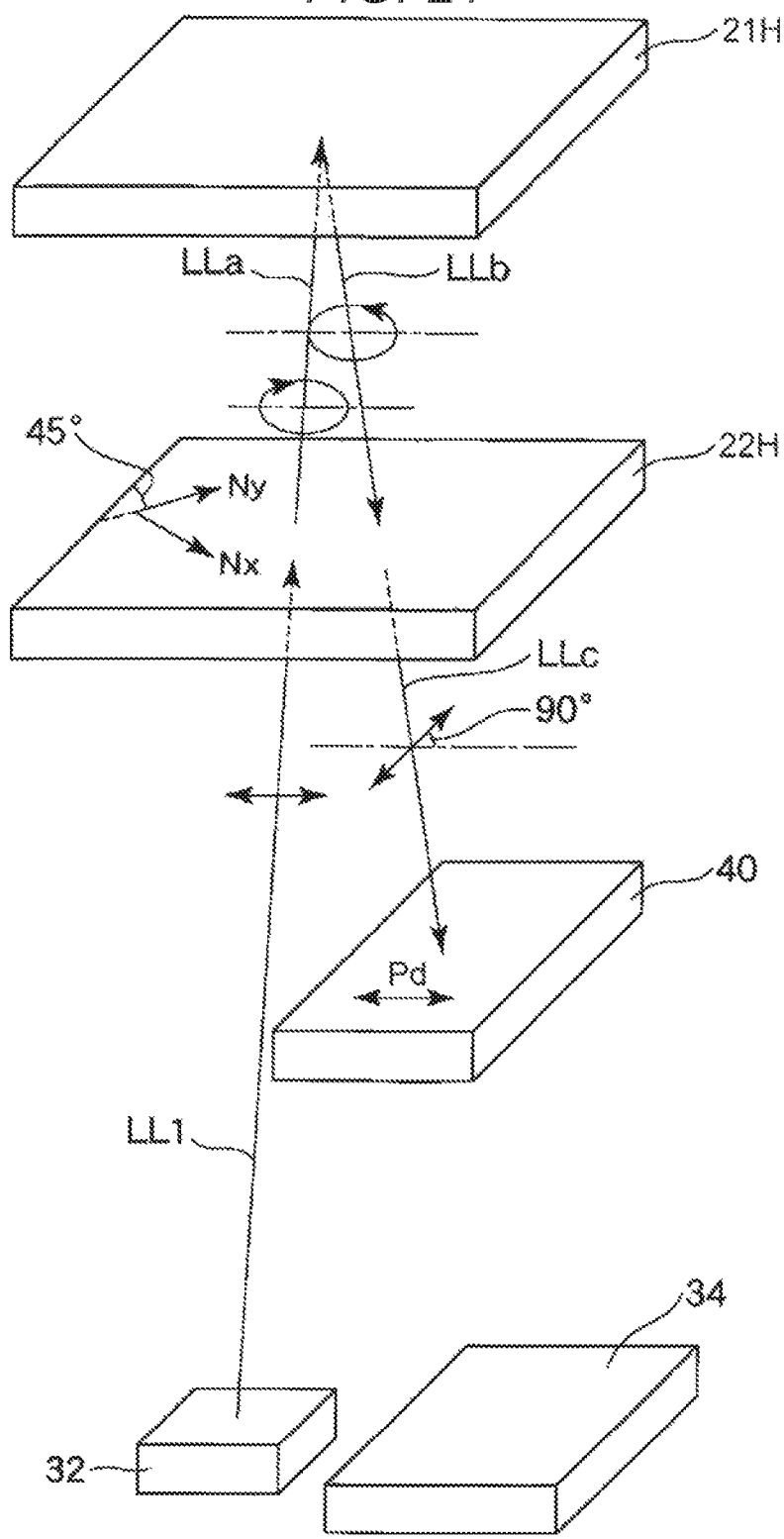
FIG. 21 is a conceptual diagram for showing the polarization state of the light that is received by the light receiving portion when the slow axis of the phase difference plate is tilted by 90° with respect to the direction of linearly polarized light from the light emitting portion.
Figure 22:
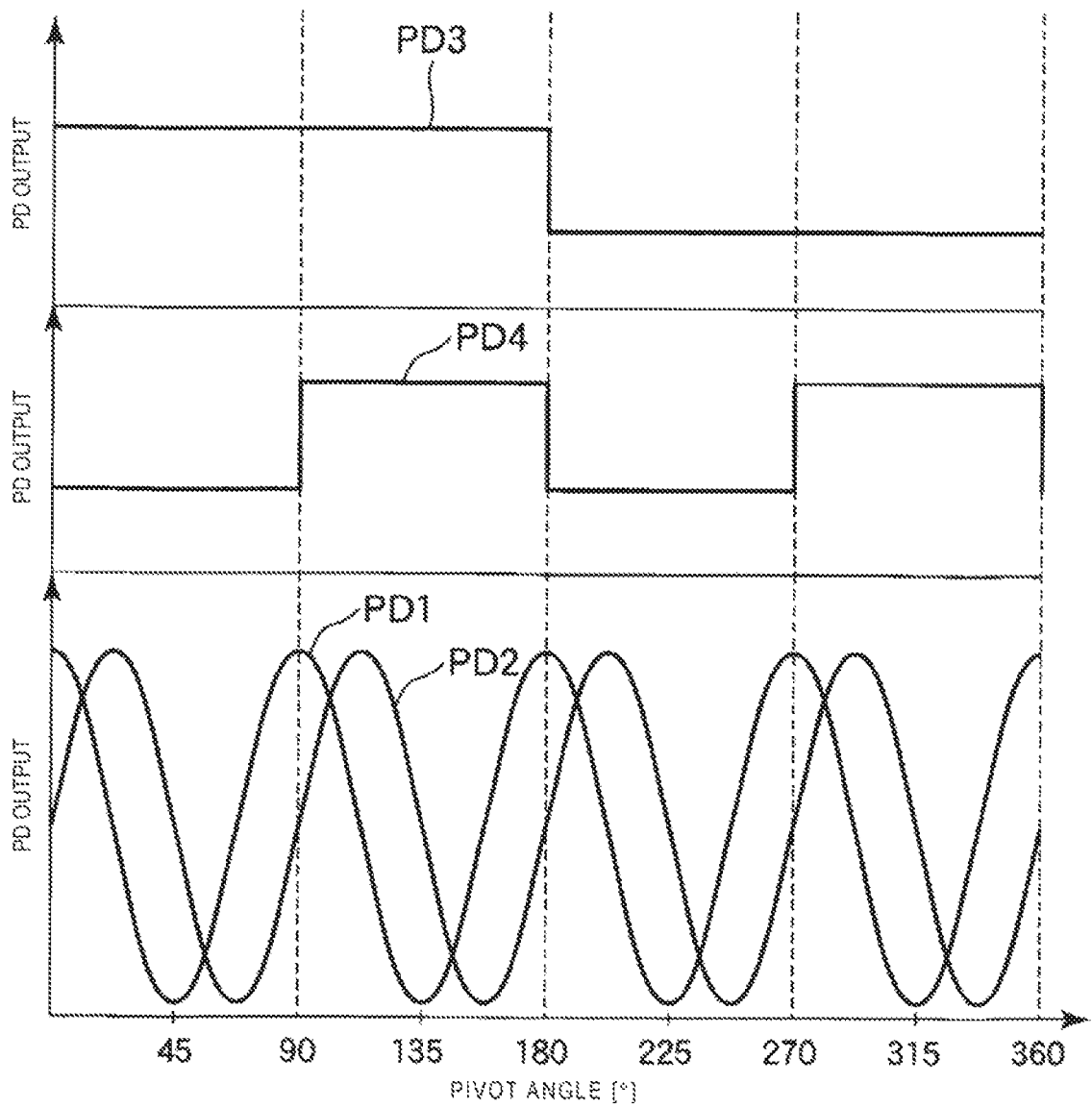
FIG. 22 is a graph illustrating a relationship between the rotation angle of the optical scale of the encoder illustrated in FIG. 18 and a current value (PD output) generated in the light receiving portion.

FIG. 18 is a sectional view (diagram cut along the XZ plane) schematically illustrating an encoder according to a ninth embodiment of the invention. FIG. 19 is a plan view (diagram viewed from the Z axis direction) of an optical scale of the encoder illustrated in FIG. 18. FIG. 20 is a conceptual diagram for showing the polarization state of the light that is received by a light receiving portion when the slow axis of a phase difference plate is parallel to the direction of linearly polarized light from a light emitting portion. FIG. 21 is a conceptual diagram for showing the polarization state of the light that is received by the light receiving portion when the slow axis of the phase difference plate is tilted by 90° with respect to the direction of linearly polarized light from the light emitting portion. FIG. 22 is a graph illustrating a relationship between the rotation angle of the optical scale of the encoder illustrated in FIG. 18 and a current value (PD output) generated in the light receiving portion.

The following description of the ninth embodiment will focus on how the ninth embodiment differs from the above-described embodiments with description of similar matters omitted. In FIGS. 18 to 22, the same reference numerals will be used to refer to the same configurations as in the above-described embodiments.

An encoder 1H illustrated in FIG. 18 is provided with an optical scale 2H pivoting around the pivot axis a, a sensor unit 3H fixedly installed and facing the optical scale 2H, and an operation unit 4H electrically connected to the sensor unit 3H.

The optical scale 2H has a reflection plate 21H along with a scale portion 22H, the 180° discrimination track 23, and a 90° discrimination track 24 disposed on one surface (lower surface in FIG. 18) of the reflection plate 21H.

The reflection plate 21H reflects light from the light emitting elements 32 and 36 and a light emitting element 38. Examples of the material constituting the reflection plate 21H, which is not particularly limited, include metal, semiconductor, glass, and resin materials. The reflection plate 21H may also be configured by two or more different types of materials being combined with each other. For example, at least two of the material constituting the part where the scale portion 22H is disposed, the material constituting the part where the 180° discrimination track 23 is disposed, and the material constituting the part where the 90° discrimination track 24 is disposed may differ from each other. In addition, the surface of the reflection plate 21H on the side where the scale portion 22H, the 180° discrimination track 23, and the 90° discrimination track 24 are disposed may be light-reflective and the other surface may not be light-reflective.

On one surface of the reflection plate 21H, the scale portion 22H, the 90° discrimination track 24, and the 180° discrimination track 23 are disposed side by side in this order from the center side of the reflection plate 21H toward the outer peripheral side of the reflection plate 21H.

A phase difference plate constitutes the scale portion 22H. The scale portion 22H is joined by an optical adhesive or the like to one surface of the reflection plate 21H. The scale portion 22H is an optical element causing a phase difference (optical path difference) of ¼ wavelength in two orthogonal polarized light components, that is, a λ/4 phase difference plate. Examples of the material constituting the scale portion 22H (phase difference plate), which is not particularly limited, include a crystal, a $MgF_2$ crystal, and a birefringent material such as a birefringent polymer. In addition, the scale portion 22H can be manufactured in the same manner as a known phase difference plate. The phase difference caused by the scale portion 22H may be (2n+1)×λ/4, in which n is an integer of at least 0. In addition, the scale portion 22H may be configured by combination of a plurality of phase difference plates such that the phase difference is generated. In this manner, the optical scale 2 has the scale portion 22H and a phase difference plate constitutes the scale portion 22H. As a result, the encoder 1H can be realized as a polarization-type encoder.

In a plan view, two regions 241 facing each other and two regions 242 facing each other constitute the 90° discrimination track 24. The 90° discrimination track 24 is split into the four regions by line segments α and β orthogonal to each other through the pivot axis a, and the regions 241 are two of the regions (upper right and lower left regions in FIG. 19) and the regions 242 are the other two of the regions (lower right and upper left regions in FIG. 19). Combinations of the regions 231, 232, 241, and 242 is a 90° discrimination pattern 13, which is an identification pattern that changes every 90° in the circumferential direction of the optical scale 2H.

Here, for example, each of the regions 231 and 241 is provided with an optically antireflective thin film and each of the regions 232 and 242 is not provided with the thin film. Examples of the thin film, which is not particularly limited, include a black coating film and a dielectric multilayer thin film (optical multilayer thin film). The 180° discrimination track 23 and the 90° discrimination track 24 can be omitted in a case where the encoder 1H is used as an incremental encoder.

In addition, the sensor unit 3H has the light emitting elements 32, 36, and 38, the light receiving elements 34, 35, and 37 and a light receiving element 39, an optical element portion 33H disposed between the light emitting element 32 and the scale portion 22H, and a polarizing plate 40 disposed on the light receiving elements 34 and 35.

The optical element portion 33H has a function to split the light LL into the first beam LL1 and the second beam LL2 and cause the light to be incident toward the scale portion 22H with the polarization direction of one of the beams shifted by 22.5° with respect to the other. The optical element portion 33H may be the optical element portion 33 according to the above-described first embodiment in which the direction of the phase difference plate 335 is changed such that the polarization direction of one of the first beam LL1 and the second beam LL2 is shifted by 22.5° with respect to the polarization direction of the other.

The light emitting element 38 may be, for example, surface emitting laser or a light emitting diode and the emitted light may or may not be polarized. The light emitting element 38 irradiates the 90° discrimination track with light. The light receiving element 39 is, for example, a photodiode using GaAs or Si. The light receiving element 39 has a function to receive the light reflected by the 90° discrimination track 24 and output a current corresponding to the intensity of the received light as a detection signal.

The polarizing plate 40 is disposed between the light receiving elements 34 and 35 and the scale portion 22H. The polarizing plate 40 can be similar in configuration to the scale portion 22 of the optical scale 2 according to the first embodiment described above.

Hereinafter, the detection principle of the encoder 1H will be described in detail with reference to FIGS. 20 and 21. FIGS. 20 and 21 representatively illustrate an action regarding the first beam LL1.

As illustrated in FIG. 20, the first beam LL1, which is linearly polarized light, is incident on the scale portion 22H and emitted from the scale portion 22H as light LLa in a polarization state corresponding to the direction of a slow axis Nx of the scale portion 22H (phase difference plate). This light LLa becomes light LLb by being reflected toward the scale portion 22H by the reflection plate 21H. This light LLb is emitted from the scale portion 22H as light LLc in a polarization state corresponding to the direction of the slow axis Nx of the scale portion 22H. This light LLc is incident on the polarizing plate 40, and only the direction component along a polarization axis direction Pd of the polarizing plate 40 is transmitted through the polarizing plate 40. As a result, light LLd as linearly polarized light in a direction along the polarization axis direction Pd is received by the light receiving element 34 from the polarizing plate 40.

FIG. 20 is a diagram illustrating a state where the slow axis Nx of the scale portion 22H is parallel to the direction of the linearly polarized light of the light LL (electric field vibration direction). In this state, each of the light LLa, the light LLb, the light LLc, and the light LLd is linearly polarized light that has the same direction as the first beam LL1. Here, the light LLc is hardly absorbed by the polarizing plate 40 and becomes the light LLd by transmission through the polarizing plate 40. The orientation of the phase difference plate of the scale portion 22H in which light advances fast (the refractive index is minimized) will be referred to as a "fast axis Ny" and the orientation in which light advances slowly (the refractive index is maximized) will be referred to as the "slow axis Nx".

As illustrated in FIG. 21, the light LLa becomes circularly polarized light in a state where the slow axis Nx of the scale portion 22H is tilted (rotated) by 45° with respect to the direction of the linearly polarized light of the first beam LL1. In addition, the light LLb becomes circularly polarized light rotating counterclockwise with respect to the light LLa. Accordingly, the light LLc becomes linearly polarized light with a vibration direction in line symmetry with respect to the slow axis Nx, that is, linearly polarized light with a direction rotated by 90° with respect to the direction of the linearly polarized light of the first beam LL1. Accordingly, the component of the light LLc in the direction other than the direction along the polarization axis direction Pd (that is, every component) is absorbed by the polarizing plate 40 and the amount of the light LLd becomes zero.

Based on this principle, the amount of the light LLd periodically changes in accordance with the tilt angle of the slow axis Nx of the scale portion 22H with respect to the direction of the linearly polarized light of the first beam LL1.

Accordingly, the signal (PD1 in FIG. 22) output from the light receiving elements 34 and 35 sinusoidally changes in accordance with the pivot angle of the optical scale 2H, with a rotation angle of 90° of the optical scale 2H as one cycle, as illustrated in FIG. 22. Still, the first beam LL1 and the second beam LL2 have different polarization directions as described above, and thus the phase of the signal from the light receiving elements 34 and 35 is shifted by 22.5° in accordance with this shift in polarization direction.

By one of these signals being used as the A phase signal and the other being used as the B phase signal, the pivot angles of the optical scale 2H can be discriminated between the ranges in which the optical scale 2H has a pivot angle of 0° to 90°, 90° to 180°, 180° to 270°, and 270° to 360°.

In addition, the regions 241 and the regions 242 of the 90° discrimination track 24 differ in reflectance from each other as described above, and thus the signal (PD4 in FIG. 22) output from the light receiving element 39 changes in a binary manner. Here, the signal from the light receiving element 39 has different values in the 0° to 90° and 180° to 270° range and the 90° to 180° and 270° to 360° range.

In addition, the region 231 and the region 232 of the 180° discrimination track 23 differ in reflectance from each other as described above, and thus the signal (PD3 in FIG. 22) output from the light receiving element 37 changes in a binary manner. Here, the signal from the light receiving element 37 has different values in the 0° to 180° range and the 180° to 360° range.

By combination of the signals from the light receiving elements 37 and 39, discrimination can be performed between the ranges of 0° to 90°, 180° to 270°, 90° to 180°, and 270° to 360°.

2. Robot

Figure 23:
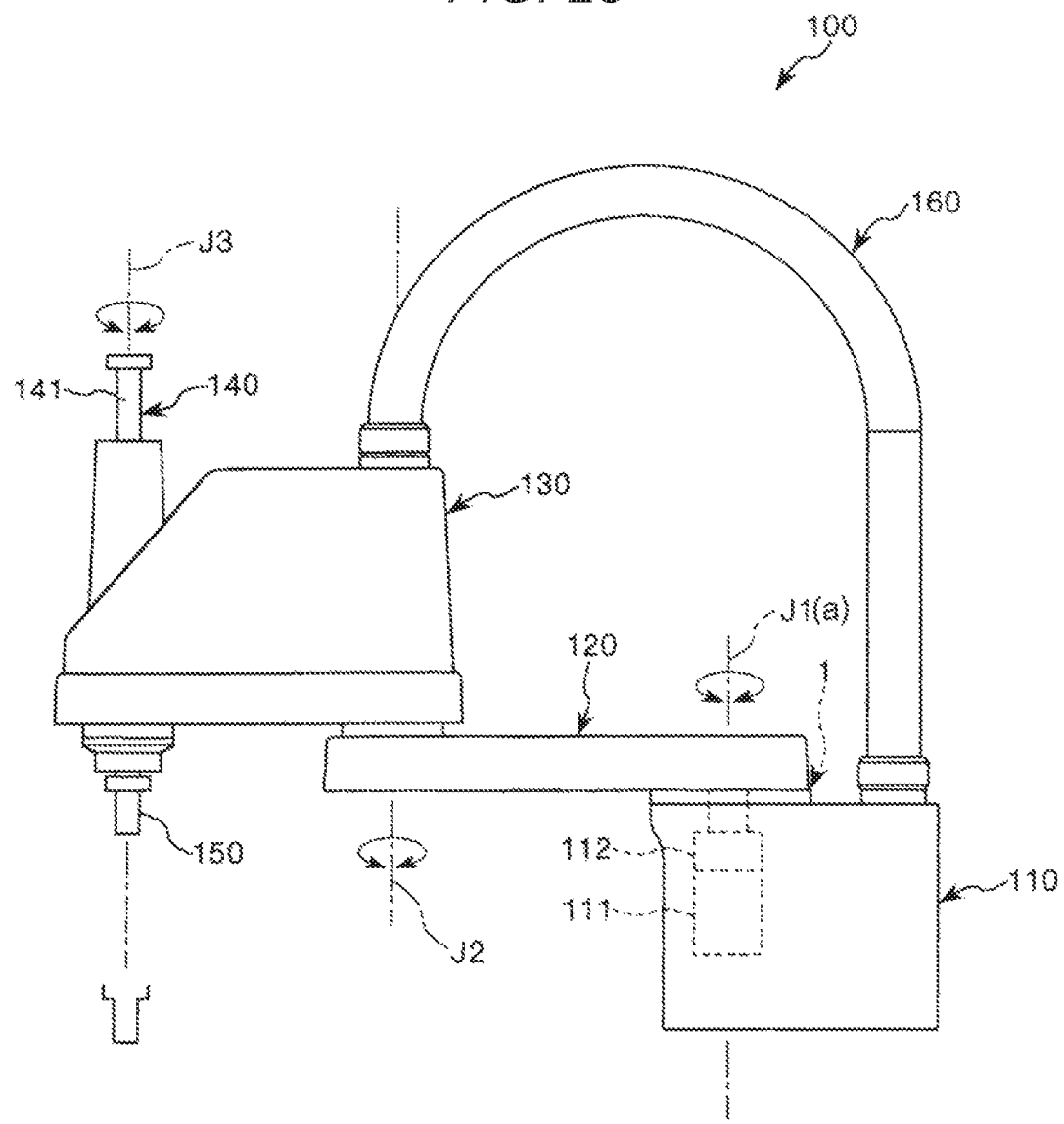
FIG. 23 is a side view illustrating an embodiment of a robot according to the invention.

FIG. 23 is a side view illustrating an embodiment of the robot according to the invention. For convenience, in the following description, the upper and lower sides in FIG. 23 will be referred to as the "upper" and "lower" sides, respectively. In addition, the base side in FIG. 23 will be referred to as the "proximal" side and the side (end effector side) that is opposite to the proximal side will be referred to as the "distal" side. In addition, the up-down and left-right directions in FIG. 23 will be referred to as the "vertical direction" and the "horizontal direction", respectively.

A robot 100 illustrated in FIG. 23 is a so-called horizontal articulated robot (SCARA robot), is used in a manufacturing process or the like for manufacturing precision mechanical equipment or the like, and is capable of, for example, gripping and transporting precision mechanical equipment, parts, and so on.

As illustrated in FIG. 23, the robot 100 has a base 110, a first arm 120, a second arm 130, a work head 140, an end effector 150, and a wiring routing portion 160. Each part of the robot 100 will be briefly described in sequence below.

The base 110 is, for example, fixed by a bolt or the like to a floor surface (not illustrated). The first arm 120 is connected to the upper end portion of the base 110. The first arm 120 is pivotable with respect to the base 110 around a pivot axis J1 (pivot axis a), which is a first axis along the vertical direction.

A motor 111 and a decelerator 112 are installed in the base 110. The motor 111 is a first motor generating a drive force for pivoting of the first arm 120, and the decelerator 112 is a first decelerator decelerating the drive force of the motor 111. The input shaft of the decelerator 112 is connected to the rotary shaft of the motor 111, and the output shaft of the decelerator 112 is connected to the first arm 120. Accordingly, once the motor 111 is driven and the drive force of the motor 111 is transmitted to the first arm 120 via the decelerator 112, the first arm 120 pivots in a horizontal plane around the pivot axis J1 with respect to the base 110. In addition, the base 110 and the first arm 120 are provided with the encoder 1 as a first encoder detecting the rotation state (pivot state) of the first arm 120 with respect to the base 110.

The second arm 130 is connected to the distal portion of the first arm 120. The second arm 130 is pivotable with respect to the first arm 120 around a second axis J2 along the vertical direction. A second motor (not illustrated) and a second decelerator (not illustrated) are installed in the second arm 130. The second motor generates a drive force for pivoting of the second arm 130, and the second decelerator decelerates the drive force of the second motor. By the drive force of the second motor being transmitted to the second arm 130 via the second decelerator, the second arm 130 pivots in a horizontal plane around the second axis J2 with respect to the first arm 120. In addition, the second motor is provided with a second encoder (not illustrated) detecting the rotation state of the second arm 130 with respect to the first arm 120.

The work head 140 is disposed in the distal portion of the second arm 130. The work head 140 has a spline shaft 141 inserted in a spline nut (not illustrated) and a ball screw nut (not illustrated) coaxially disposed in the distal portion of the second arm 130. The spline shaft 141 is capable of rotating around an axis J3 and moving (elevating) in the up-down direction with respect to the second arm 130.

A rotary motor (not illustrated) and an elevation motor (not illustrated) are disposed in the second arm 130. The drive force of the rotary motor is transmitted to the spline nut by a drive force transmission mechanism (not illustrated), and the spline shaft 141 performs forward and reverse rotation around the axis J3 along the vertical direction as a result of forward and reverse rotation of the spline nut. In addition, the rotary motor is provided with a third encoder (not illustrated) detecting the rotation state of the spline shaft 141 with respect to the second arm 130.

The drive force of the elevation motor is transmitted to the ball screw nut by the drive force transmission mechanism (not illustrated), and the spline shaft 141 moves upwards and downwards as a result of forward and reverse rotation of the ball screw nut. The elevation motor is provided with a fourth encoder detecting how much the spline shaft 141 moves with respect to the second arm 130.

The end effector 150 is connected to the distal portion (lower end portion) of the spline shaft 141. Examples of the end effector 150, which is not particularly limited, include one gripping a transported object and one processing a workpiece.

A plurality of wires connected to each of the electronic parts (such as the second motor, the rotary motor, the elevation motor, and the second to fourth encoders) disposed in the second arm 130 are routed to the inside of the base 110 through the tubular wiring routing portion 160 connecting the second arm 130 and the base 110 to each other. Furthermore, by being gathered in the base 110, the plurality of wires are routed to a control device (not illustrated) along with the wiring connected to the motor 111 and the encoder 1. The control device is installed outside the base 110 and controls the robot 100 as a whole.

As described above, the robot 100 is provided with the encoder 1 or 1H according to any one of the first to ninth embodiments. This robot 100 uses the small encoder 1 or 1H, and thus the degree of freedom in design can be enhanced for the robot 100.

3. Printer

Figure 24:
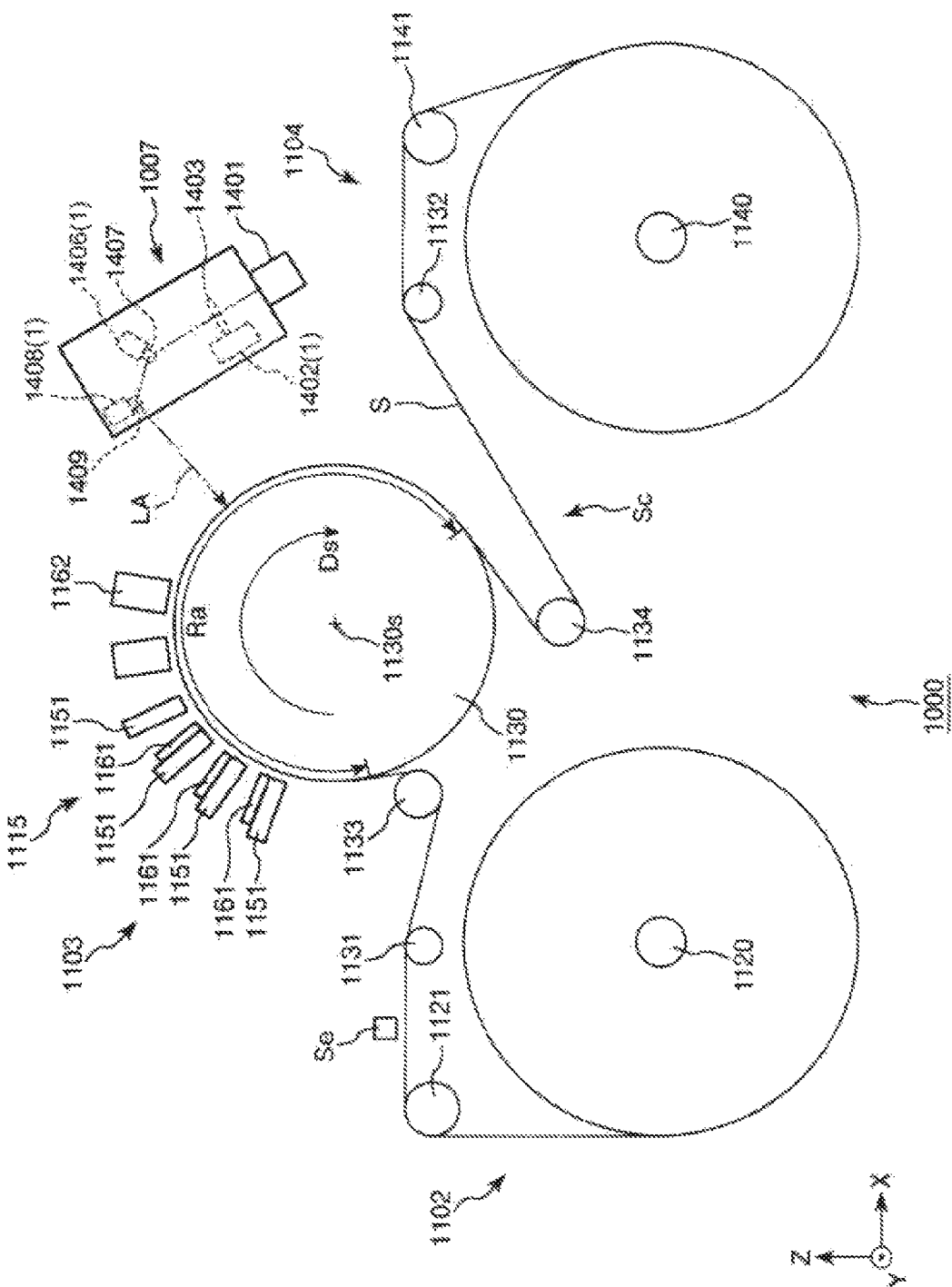
FIG. 24 is a side view illustrating an embodiment of a printer according to the invention.

FIG. 24 is a side view illustrating an embodiment of the printer according to the invention.

A printer 1000 illustrated in FIG. 24 is a label printing device provided with a drum-shaped platen. In the printer 1000, one sheet S (web) stretches between a feeding shaft 1120 and a winding shaft 1140. The sheet S, which is a paper- or film-type sheet or the like, are wound in a roll shape as a recording medium around the feeding shaft 1120 and the winding shaft 1140. The sheet S is transported from the feeding shaft 1120 to the winding shaft 1140 along a transport path Sc that stretches in this manner. The printer 1000 is configured to record (form) an image on the sheet S by discharging a functional liquid with respect to the sheet S transported along the transport path Sc.

In a schematic configuration, the printer 1000 is configured to include a feeding unit 1102 feeding the sheet S from the feeding shaft 1120, a process unit 1103 recording an image on the sheet S fed from the feeding unit 1102, a laser scanner device 1007 cutting the sheet S after the image is recorded by the process unit 1103, and a winding unit 1104 winding the sheet S around the winding shaft 1140.

The feeding unit 1102 has the feeding shaft 1120 around which an end of the sheet S is wound and a driven roller 1121 around which the sheet S drawn from the feeding shaft 1120 is wound.

The process unit 1103 records an image on the sheet S by supporting the sheet S fed from the feeding unit 1102 with a platen drum 1130 as a support portion while appropriately performing processing by means of, for example, recording heads 1151 disposed in a head unit 1115 disposed along the outer peripheral surface of the platen drum 1130.

The platen drum 1130 is a cylindrical drum supported by a support mechanism (not illustrated) to be rotatable around a drum shaft 1130s. The platen drum 1130 winds the sheet S transported from the feeding unit 1102 to the winding unit 1104 from the back surface (surface on the side opposite to the recording surface) side. The platen drum 1130 supports the sheet S from the back surface side over a range Ra in the circumferential direction while being driven and rotated in a transport direction Ds of the sheet S by receiving the frictional force between the sheet S and the platen drum 1130. Here, in the process unit 1103, driven rollers 1133 and 1134 folding the sheet S back are disposed on both sides of the portion for winding around the platen drum 1130. In addition, the driven roller 1121, a driven roller 1131, and a sensor Se are disposed between the feeding shaft 1120 and the driven roller 1133 and driven rollers 1132 and 1141 are disposed between the winding shaft 1140 and the driven roller 1134.

The process unit 1103 is provided with the head unit 1115. The head unit 1115 is provided with the four recording heads 1151 corresponding to yellow, cyan, magenta, and black. Each of the recording heads 1151 faces the surface of the sheet S wound around the platen drum 1130 with a slight clearance (platen gap) and discharges a functional liquid that has a corresponding color from a nozzle by an ink jet method. A color image is formed on the surface of the sheet S by each of the recording heads 1151 discharging the functional liquid with respect to the sheet S transported in the transport direction Ds.

Here, an ultraviolet (UV) ink (photocurable ink) cured by UV (light) irradiation is used as the functional liquid. Accordingly, in the head unit 1115 of the process unit 1103, a first UV light source 1161 (light irradiation unit) is disposed between every two adjacent recording heads 1151 so that the UV ink is temporarily cured and settled on the sheet S. In addition, a second UV light source 1162 as a curing unit for final curing is disposed on the downstream side in the transport direction Ds with respect to the plurality of recording heads 1151 (head unit 1115).

The laser scanner device 1007 is disposed to partially cut or divide the sheet S after image recording. The sheet S as a workpiece is irradiated with laser light oscillated by a laser oscillator 1401 of the laser scanner device 1007 via, for example, a first lens 1403, a first mirror 1407, and a second mirror 1409 controlled in position or rotation position (angle) by drive devices 1402, 1406, and 1408 including the encoder 1. In this manner, a desired position on the sheet S can be irradiated with laser light LA with which the sheet S is irradiated with an irradiation position controlled by each of the drive devices 1402, 1406, and 1408. The part of the sheet S that is irradiated with the laser light LA undergoes fusion and is partially cut or divided.

As described above, the printer 1000 is provided with the encoder 1 or 1H according to any one of the first to ninth embodiments. This printer 1000 uses the small encoder 1 or 1H, and thus the degree of freedom in design can be enhanced for the printer 1000.

Although the encoder, the printer, and the robot according to the invention have been described above based on the illustrated preferred embodiments, the invention is not limited thereto and the configuration of each part can be replaced with any configuration that has a similar function. In addition, any other component may be added thereto.

Although a case where the encoder according to the invention is applied to a rotary encoder has been described in the above-described embodiments, the invention is not limited thereto and the encoder according to the invention can also be applied to a linear encoder.

In addition, the place where the encoder is installed is not limited to a joint portion between the base and the first arm and may also be a joint portion between any two relatively pivoting arms. In addition, the place where the encoder is installed is not limited to a joint portion of the robot.

Although the number of robot arms according to the above-described embodiments is one, the number of robot arms is not limited thereto and may also be two or more. In other words, the robot according to the invention may also be a robot with a plurality of arms such as a double-arm robot.

Although the robot according to the above-described embodiments has two arms, the number of arms is not limited thereto and may also be, for example, one or at least three.

According to the above-described embodiments, the robot according to the invention is installed on a floor surface. However, the robot installation place is not limited thereto and may also be, for example, a ceiling surface or a side wall surface. In addition, the robot according to the invention is not limited to being fixedly installed in a structure such as a building. For example, the robot may also be a legged walking (traveling) robot that has a leg.

Although a horizontal articulated robot has been described as an example of the robot according to the invention in the above-described embodiments, the robot according to the invention may also be a robot of any other type, such as a vertical articulated robot, insofar as the robot has two relatively pivoting members.

The encoder according to the invention can be used in various devices that have a rotary shaft, which are not limited to the robot and the printer described above.

The entire disclosure of Japanese Patent Application No. 2017-189830, filed Sep. 29, 2017 is expressly incorporated by reference herein.

What is claimed is:

1. An encoder comprising:
    a light source emitting light;
    an optical element located in radiation receiving relation to the light source, the optical element being configured with:
        a prism receiving the light from the light source, the light propagating through the prism;
        a first mirror disposed on an outer surface of the prism, the first mirror being located on an optical path of the light and reflecting the light as reflected light; and
        a beam splitter disposed on the outer surface of the prism, the beam splitter being located on an optical path of the reflected light and splitting the reflected light into a first beam and a second beam;
    an optical scale being spaced apart from the light source and the optical element, the optical scale being located closer to the optical element than the light source, the optical scale receiving the first beam and the second beam from the optical element and reflecting the first beam and the second beam as reflected first and second beams; and
    a light receiving element receiving the reflected first beam and the reflected second beam from the optical scale and outputting a signal in accordance with an intensity of each of the reflected first beam and the reflected second beam,
    wherein the first beam traveling from the beam splitter is incident on the optical scale without passing through the prism, and the second beam traveling from the beam splitter passes through the prism to the optical scale.
2. The encoder according to claim 1,
    wherein the optical element includes a second mirror disposed on the outer surface of the prism, and the second mirror is located on an optical path of the second beam, and
    the second beam traveling from the beam splitter passes through the prism and is reflected by the second mirror to the optical scale.
3. The encoder according to claim 1, wherein the optical scale is pivotably disposed.
4. The encoder according to claim 1,
    wherein the optical scale includes a polarizer or a phase difference plate.
5. The encoder according to claim 1,
    wherein the light source has a light emitting element emitting linearly polarized light as the light.
6. The encoder according to claim 1,
    wherein the first beam and the second beam intersect on a beam incident surface of the optical scale.
7. The encoder according to claim 1,
    wherein the light receiving element is on a same surface side as the light source and the optical element with respect to the optical scale.
8. The encoder according to claim 1,
    wherein a distance between the optical scale and the light source differs from a distance between the optical scale and the light receiving element.
9. The encoder according to claim 1,
    wherein the prism is configured with a plurality of prisms joined to each other.
10. A printer comprising the encoder according to claim 1.
11. A printer comprising the encoder according to claim 2.
12. A printer comprising the encoder according to claim 3.
13. A printer comprising the encoder according to claim 4.
14. A printer comprising the encoder according to claim 5.
15. A printer comprising the encoder according to claim 6.
16. A robot comprising the encoder according to claim 1.
17. A robot comprising the encoder according to claim 2.
18. A robot comprising the encoder according to claim 3.
19. A robot comprising the encoder according to claim 4.
20. A robot comprising the encoder according to claim 5.

* * * * *